United States Patent
Asai et al.

(10) Patent No.: US 9,400,794 B2
(45) Date of Patent: Jul. 26, 2016

(54) GROUP MANAGEMENT APPARATUS, SUBSTRATE PROCESSING SYSTEM AND METHOD OF MANAGING FILES OF SUBSTRATE PROCESSING APPARATUS

(71) Applicant: Hitachi Kokusai Electric Inc., Tokyo (JP)

(72) Inventors: Kazuhide Asai, Toyama (JP); Osamu Ueda, Toyama (JP); Hiroyuki Iwakura, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 150 days.

(21) Appl. No.: 13/944,663

(22) Filed: Jul. 17, 2013

(65) Prior Publication Data
US 2014/0025677 A1    Jan. 23, 2014

(30) Foreign Application Priority Data

Jul. 17, 2012  (JP) ................................ 2012-158891
May 31, 2013  (JP) ................................ 2013-116104

(51) Int. Cl.
G06F 17/30    (2006.01)
G05B 19/418   (2006.01)

(52) U.S. Cl.
CPC .... *G06F 17/30091* (2013.01); *G05B 19/41865* (2013.01); *G06F 17/30864* (2013.01); *G05B 2219/32096* (2013.01); *G05B 2219/45031* (2013.01); *Y02P 90/20* (2015.11)

(58) Field of Classification Search
CPC ........................ G06F 17/30598; G06F 17/3002

USPC .................................................. 707/737, 758
See application file for complete search history.

(56) References Cited

U.S. PATENT DOCUMENTS

| 6,766,334 B1 * | 7/2004 | Kaler et al. |
| 8,443,484 B2 * | 5/2013 | Ozaki et al. ..................... 15/303 |
| 2004/0216089 A1 * | 10/2004 | Kaler et al. .................... 717/120 |
| 2006/0149403 A1 * | 7/2006 | Shimizu et al. ................. 700/96 |

(Continued)

FOREIGN PATENT DOCUMENTS

| JP | 05-135064 | 6/1993 |
| JP | 2006-073845 | 3/2006 |

(Continued)

OTHER PUBLICATIONS

Christoph Elsner et al, Fixing Configuration Inconsistencies Across File Type Boundaries, 2011, IEEE, 116-123.*

(Continued)

*Primary Examiner* — Jean B Fleurantin
(74) *Attorney, Agent, or Firm* — Edell, Shapiro & Finnan LLC

(57) ABSTRACT

There is provided a group management apparatus connected to a substrate processing apparatus configured to store at least a configuration file, the group management apparatus including a controller configured to: receive a command for generating a file group for the configuration file; receive the configuration file and at least one associated file related to the configuration file from the substrate processing apparatus according to the command for generating the file group; and generate the file group including the configuration file and the associated file received from the substrate processing apparatus and store the file group in a state where an output is possible.

11 Claims, 17 Drawing Sheets

(56) References Cited

U.S. PATENT DOCUMENTS

2008/0256456 A1* 10/2008 Koshimaki .................. 715/736
2009/0044749 A1* 2/2009 Ozaki et al. ................ 118/698
2012/0323855 A1* 12/2012 Koyama et al. ............. 707/661

FOREIGN PATENT DOCUMENTS

| | | |
|---|---|---|
| JP | 2006252043 | 9/2006 |
| JP | 2009175927 | 8/2009 |
| TW | 200901269 A | 1/2009 |

OTHER PUBLICATIONS

Office Action in corresponding Taiwanese Patent Application No. 102125188, mailed on Aug. 3, 2015, along with English translation.

Office Action in corresponding Korean Application No. 10-2013-0083232, dated Dec. 9, 2014, along with an English translation.

* cited by examiner

<PRIOR ART>

GROUP MANAGEMENT APPARATUS, SUBSTRATE PROCESSING SYSTEM AND METHOD OF MANAGING FILES OF SUBSTRATE PROCESSING APPARATUS

CROSS REFERENCE TO RELATED APPLICATIONS

This application claims foreign priority under 35 U.S.C. §119(a)-(d) to Application No. JP 2012-158891 filed on Jul. 17, 2012 and Application No. JP 2013-116104 filed on May 31, 2013, the entire contents of each of which are hereby incorporated by reference.

FIELD OF THE INVENTION

The present invention relates to a group management apparatus connected to a substrate processing apparatus configured to process a substrate, a substrate processing system and a non-transitory computer-readable recording medium storing a file group generating program.

BACKGROUND

A substrate processing apparatus configured to process a substrate stores at least one parameter file related to process recipe files, e.g., a process recipe file defining process conditions and order, a temperature control parameter file including a temperature control table, and a pressure control parameter file including a pressure control table. In general, the substrate processing apparatus stores a large number of such recipe files or parameter files.

SUMMARY

As described above, an operator should manually detect a desired file from a large number of files and a high workload may thus be placed on the operator. Thus, a desired file may be omitted during the detection due to the operator's mistake or the like.

It is an object of the present invention to provide a group management apparatus capable of not only reducing the rate of omission of files but also lowering the workload on an operator when a desired file is obtained from a substrate processing apparatus, a substrate processing system and a non-transitory computer-readable recording medium storing a file group generating program.

According to one aspect of the present invention, there is provided a group management apparatus connected to a substrate processing apparatus configured to store at least a configuration file, the group management apparatus including a controller configured to: receive a command for generating a file group for the configuration file; receive the configuration file and at least one associated file related to the configuration file from the substrate processing apparatus according to the command for generating the file group; and generate the file group including the configuration file and the associated file received from the substrate processing apparatus and store the file group in a state where an output is possible.

According to another aspect of the present invention, there is provided a substrate processing system including a substrate processing apparatus configured to store at least a configuration file; and a group management apparatus connected to the substrate processing apparatus, wherein the group management apparatus is configured to: receive a command for generating a file group for the configuration file; receive the configuration file and at least one associated file related to the configuration file from the substrate processing apparatus according to the command for generating the file group; and generate the file group including the configuration file and the associated file received from the substrate processing apparatus and store the file group in a state where an output is possible.

According to another aspect of the present invention, there is provided a non-transitory computer-readable recording medium storing a file group generating program that causes a computer connected to a substrate processing apparatus to perform sequences of: receiving a command for generating a file group for the configuration file; receiving the configuration file and at least one associated file related to the configuration file from the substrate processing apparatus according to the command for generating the file group; and generating the file group including the configuration file and the associated file received from the substrate processing apparatus and store the file group in a state where an output is possible.

DETAILED DESCRIPTION

An embodiment of the present invention will now be described with reference to the accompanying drawings.

(1) Structure of Substrate Processing System

Figure 1:
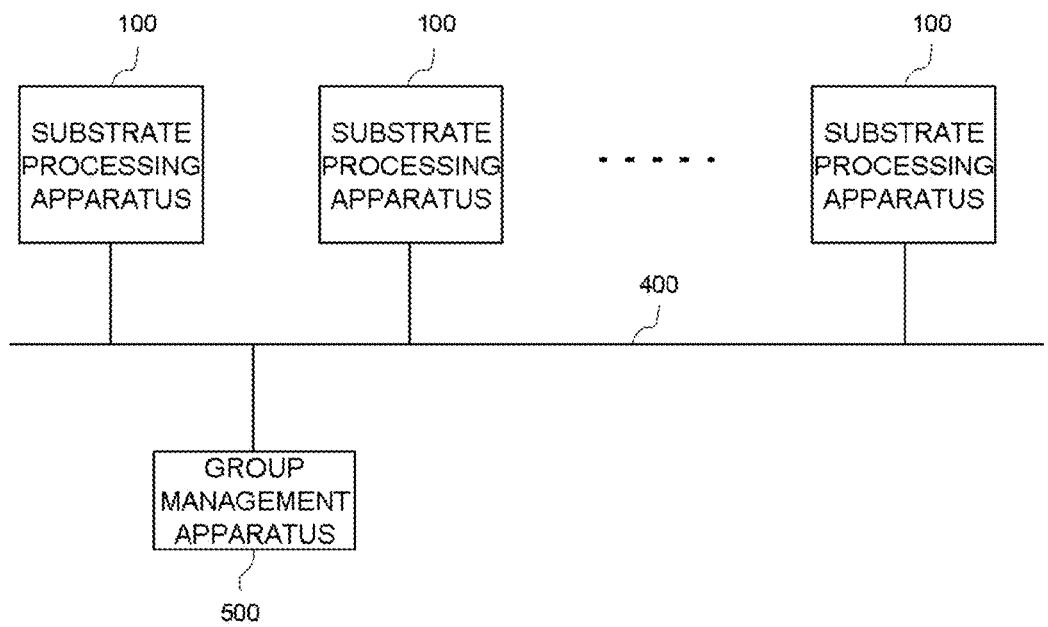
FIG. 1 is a schematic configuration diagram of a substrate processing system including a group management apparatus according to an embodiment of the present invention.

First, the structure of a substrate processing system according to an embodiment of the present invention will be described with reference to FIG. 1. FIG. 1 is a schematic configuration diagram of a substrate processing system according to the present embodiment.

As illustrated in FIG. 1, the substrate processing system according to the present embodiment includes at least one substrate processing apparatus 100 and a group management apparatus 500 connected to the substrate processing apparatus 100 to exchange data with the substrate processing apparatus 100. The substrate processing apparatus 100 and the group management apparatus 500 are connected, for example, via a network 400, such as a local area network (LAN), a wide area network (WAN), or the like.

(2) Structure of Substrate Processing Apparatus

Figure 9:
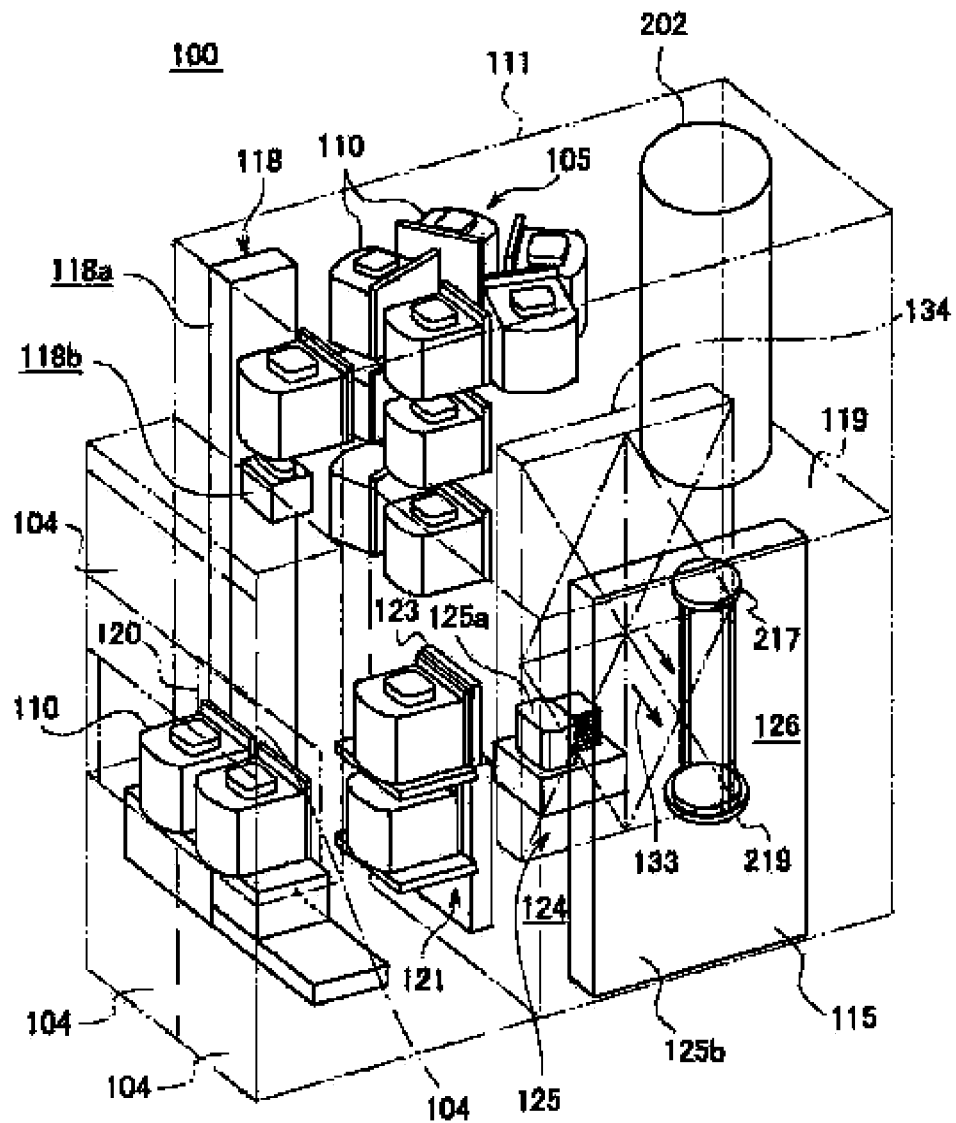
FIG. 9 is a perspective view of a substrate processing apparatus according to an embodiment of the present invention.
Figure 10:
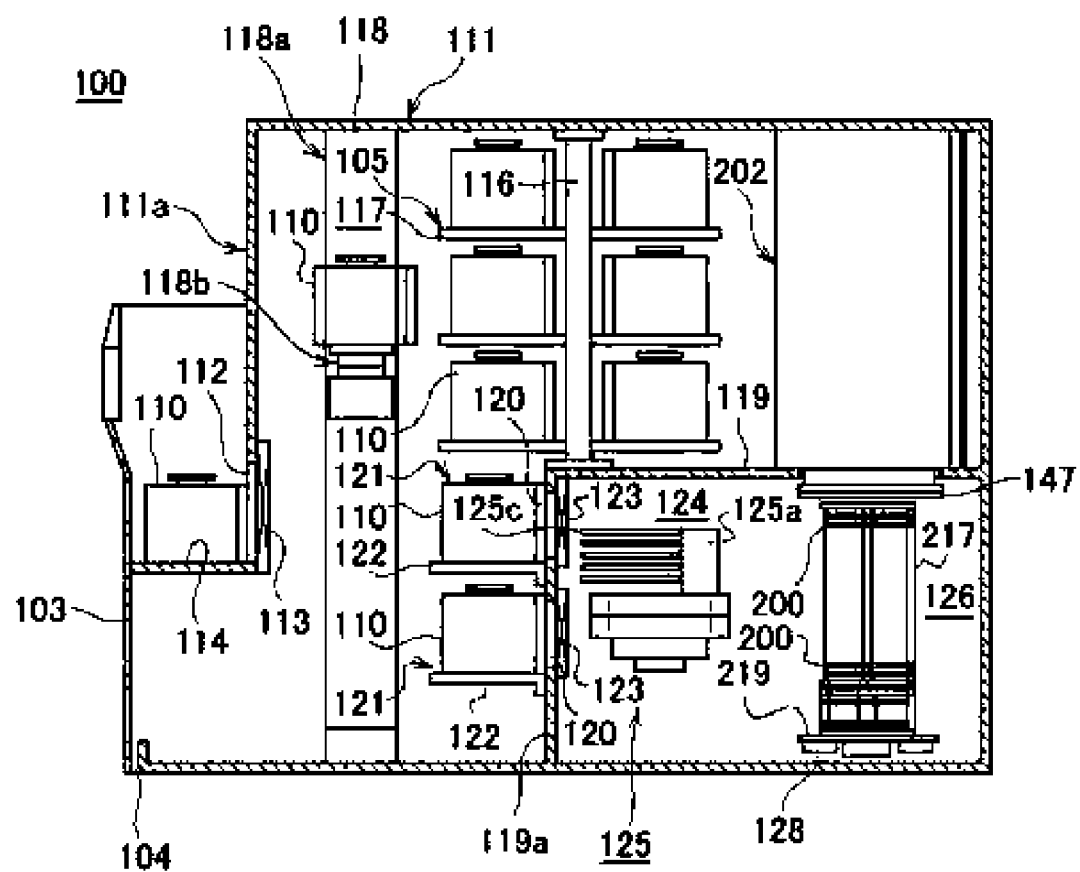
FIG. 10 is a side perspective view of a substrate processing apparatus according to an embodiment of the present invention.

Next, the structure of the substrate processing apparatus 100 according to the present embodiment will be described mainly with reference to FIGS. 9 and 10. FIG. 9 is a perspective view of the substrate processing apparatus 100 according to the present embodiment. FIG. 10 is a side perspective view of the substrate processing apparatus 100 according to the present embodiment. Also, the substrate processing apparatus 100 according to the present embodiment is embodied as, for example, a longitudinal apparatus that performs oxidization, diffusion treatment, chemical vapor deposition (CVD), etc., on a substrate such as a wafer.

As illustrated in FIGS. 9 and 10, the substrate processing apparatus 100 according to the present embodiment includes a housing 111 serving as a pressure-resistant container. At the front of a front wall 111a of the housing 111, a front maintenance opening 103 is installed as an opening via which maintenance is performed. In the front maintenance opening 103, a front maintenance door 104 is installed to open/close the front maintenance opening 103.

To transfer a wafer 200 which is a substrate formed of silicon (Si) or the like inside or outside the housing 111, a pod 110 serving as a wafer carrier (substrate container) is used to accommodate a plurality of wafers 200 therein. On the front wall 111a of the housing 111, a pod loading/unloading port 112 (substrate container loading/unloading port) is installed to communicate inside/outside the housing 111. The pod loading/unloading port 112 is configured to be opened/closed by the front shutter 113 (substrate container loading/unloading port opening/closing mechanism). A load port 114 (substrate container receiving table) is installed at the front of and below the pod loading/unloading port 112. The pod 110 is configured to be transferred and placed on the load port 114 by an in-process transfer device.

In the housing 111, a pod transfer device 118 (substrate container transfer device) is installed near the load port 114. In the housing 111, a rotary pod shelf 105 (substrate container holding shelf) is installed upward on a roughly central portion between the front and the rear of the housing 111 at the back of the pod transfer device 118.

The pod transfer device 118 includes a pod elevator 118a (substrate container elevating mechanism) configured to be moved upward/downward while retaining the pod 110 and a pod transfer mechanism 118b (substrate container transfer mechanism) which is a transfer mechanism. The pod transfer device 118 is configured to transfer the pod 110 among the load port 114, the rotary pod shelf 105 and a pod opener 121 through continuous operations of the pod elevator 118a and the pod transfer mechanism 118b.

The rotary pod shelf 105 is configured to store a plurality of pods 110 thereon. The rotary pod shelf 105 includes a pillar 116 which is vertically installed to be intermittently rotated within a horizontal plane and a plurality of sheets of shelf boards 117 (substrate container placing tables) supported in a radial form at upper, middle and lower portions of the pillar 116. The plurality of sheets of shelf boards 117 are configured to retain a plurality of pods 110 while the plurality of pods 110 are placed thereon.

A sub-housing 119 is installed at the inner bottom of the housing 111, ranging from a roughly central portion between the front and back of the housing 111 to a rear end of the housing 111. A pair of wafer loading/unloading ports 120 (substrate loading/unloading ports) configured to transfer the wafer 200 inside/outside the sub-housing 119 are vertically installed on upper and lower portions of a front wall 119a of the sub-housing 119. Pod openers 121 (substrate container lid opening/closing mechanisms] are installed at the wafer loading/unloading ports 120 on the upper and lower portions of the front wall 119a, respectively.

The pod openers 121 each include one of a pair of placing tables 122 on which the pod 110 is placed and one of a pair of cap attaching/detaching mechanisms 123 (lid attaching/detaching mechanism) configured to attach/detach a cap (lid) of the pod 110. Each of the pod openers 121 is configured to open/close a wafer entrance of the pod 110 by attaching/detaching the cap of the pod 110 placed on the placing table 122 with the cap attaching/detaching mechanism 123.

In the sub-housing 119, a transfer chamber 124 is formed to be fluidically insulated from a space in which the pod transfer device 118, the rotary pod shelf 105, or the like is installed. In the transfer chamber 124, a wafer transfer mechanism 125 (substrate transfer mechanism) is installed near a front inner surface of the transfer chamber 124. The wafer transfer mechanism 125 includes a wafer transfer device 125a (substrate transfer device) configured to horizontally rotate or straightly move the wafer 200 and a wafer transfer device elevator 125b (substrate transfer device elevating mechanism) configured to move the wafer transfer device 125a upward/downward. The wafer transfer device elevator 125b is installed between a front right end of the transfer chamber 124 in the sub-housing 119 and a right end of the housing 111 (see FIG. 9). The wafer transfer device 125a includes tweezers 125c (substrate holding member) serving as a supporter of the wafer 200. The wafer transfer mechanism 125 is configured to load the wafer 200 in a boat 217 (substrate retainer) or unload the wafer 200 from the boat 217 through continuous operations of the wafer transfer device elevator 125b and the wafer transfer device 125a.

A waiting station 126 is installed at the back of the transfer chamber 124 to accommodate the boat 217 that waits to be processed. A process furnace 202 configured to process the wafer 200 is installed above the waiting station 126. A bottom end portion of the process furnace 202 is configured to be opened/closed by a furnace port shutter 147 (furnace port opening/closing mechanism). The structure of the process furnace 202 will be described below.

A boat elevator 115 (substrate retainer elevating mechanism) is installed between a right end of the waiting station 126 in the sub-housing 119 and a right end of the housing 111 to move the boat 217 upward/downward (see FIG. 9). An arm 128 serving as a connector is connected to a platform of the boat elevator 115. A seal cap 219 serving as a furnace port lid is horizontally installed on the arm 128. The seal cap 219 is configured to vertically support the boat 217 to block the bottom end portion of the process furnace 202.

The boat 217 is configured to horizontally support a plurality of wafers 200 (e.g., 50 to 125 sheets of wafers 200) so that the plurality of wafers 200 are concentrically aligned in a vertical direction.

As illustrated in FIG. 9, a clean unit 134 which includes a supply fan and a dustproof filter is installed at a side of the transfer chamber 124 toward the wafer transfer device elevator 125b and a left end of the transfer chamber 124 opposite to the boat elevator 115 so as to supply clean air 133 (e.g., a cleaned atmosphere or an inert gas). The clean air 133 blown out of the clean unit 134 circulates around a notch alignment device, the wafer transfer device 125a and the boat 217 in the waiting station 126, and is then absorbed by a duct to be exhausted outside the housing 111 or to be circulated to a first side (supply side) which is an absorbing side of the clean unit 134 so that the clean air 133 is blown out to the transfer chamber 124 again via the clean unit 134.

(3) Operation of Substrate Processing Apparatus

Next, operations of the substrate processing apparatus 100 according to the present embodiment will be described mainly with reference to FIGS. 9 and 10. The operations of the substrate processing apparatus 100 are performed, for example, based on a transfer recipe. The transfer recipe is used to transfer the wafer 200 in the substrate processing apparatus 100. For example, the transfer recipe is applied to a substrate processing process together with a process recipe for performing substrate processing.

As illustrated in FIGS. 9 and 10, when the pod 110 is supplied to the load port 114, the pod loading/unloading port 112 is opened by the front shutter 113. Then, the pod 110 placed on the load port 114 is loaded from the pod loading/unloading port 112 into the housing 111 by the pod transfer device 118.

The pod 110 loaded into the housing 111 is automatically transferred to the shelf board 117 of the rotary pod shelf 105 by the pod transfer device 118, temporarily stored on the shelf board 117, and then transferred onto the placing table 122 of one of the pod openers 121 from the shelf board 117. Alternatively, the pod 110 loaded into the housing 111 may be directly transferred to the placing table 122 of one of the pod openers 121 by the pod transfer device 118. The wafer loading/unloading port 120 of the pod opener 121 is blocked by the cap attaching/detaching mechanism 123, and clean air 133 flows into the transfer chamber 124 such that the transfer chamber 124 is filled with the clean air 133. For example, by filling the transfer chamber 124 with the clean air 133, which is an inert gas or the like, the transfer chamber 124 is set to have, for example, an oxygen concentration of 20 ppm or less, which is significantly lower than an oxygen concentration in the housing 111 having atmospheric atmosphere.

An opening-side end face of the pod 110 placed on the placing table 122 is pressed against an opening periphery section of the wafer loading/unloading port 120 at the front wall 119a of the sub-housing 119. Then, the cap of the pod 110 is detached by the cap attaching/detaching mechanism 123 to open the wafer entrance. Then, the wafer 200 is picked up from the inside of the pod 110 via the wafer entrance by the tweezers 125c of the wafer transfer device 125a. Thereafter, the wafer 200 is aligned in the notch alignment device in a circumferential direction, loaded into the waiting station 126 at the rear of the transfer chamber 124, and then loaded (charged) into the boat 217. After loading the wafer 200 into the boat 217, the wafer transfer device 125a returns to the pod 110 and loads a next wafer 200 into the boat 217.

While the wafer 200 is loaded into the boat 217 from one of the pod openers 121, e.g., the upper or lower pod opener 121, by the wafer transfer mechanism 125, another pod 110 is transferred onto the placing table 122 of the other pod opener 121 (the lower or upper pod opener 121) from the rotary pod shelf 105 by the pod transfer device 118. The pod 110 is opened by the pod opener 121 subsequently with the loading of the wafer 200.

When a predetermined number of wafers 200 are loaded into the boat 217, the bottom end portion of the process furnace 202 blocked by the furnace port shutter 147 is opened. Then, by raising the seal cap 219 by the boat elevator 115, the boat 217 retaining the wafer 200 is loaded into the process furnace 202 (boat loading).

After the boat loading, predetermined processes are performed on the wafers in the process furnace 202. Then, the boat 217 retaining the processed wafers 200 is unloaded from a process chamber 201, and the pods 110 storing the processed wafers 200 are unloaded from the housing 111 in an order that is the reverse of the order of the above-described operations, except for the wafer alignment using the notch alignment device.

(4) Structure of Process Furnace

Figure 11:
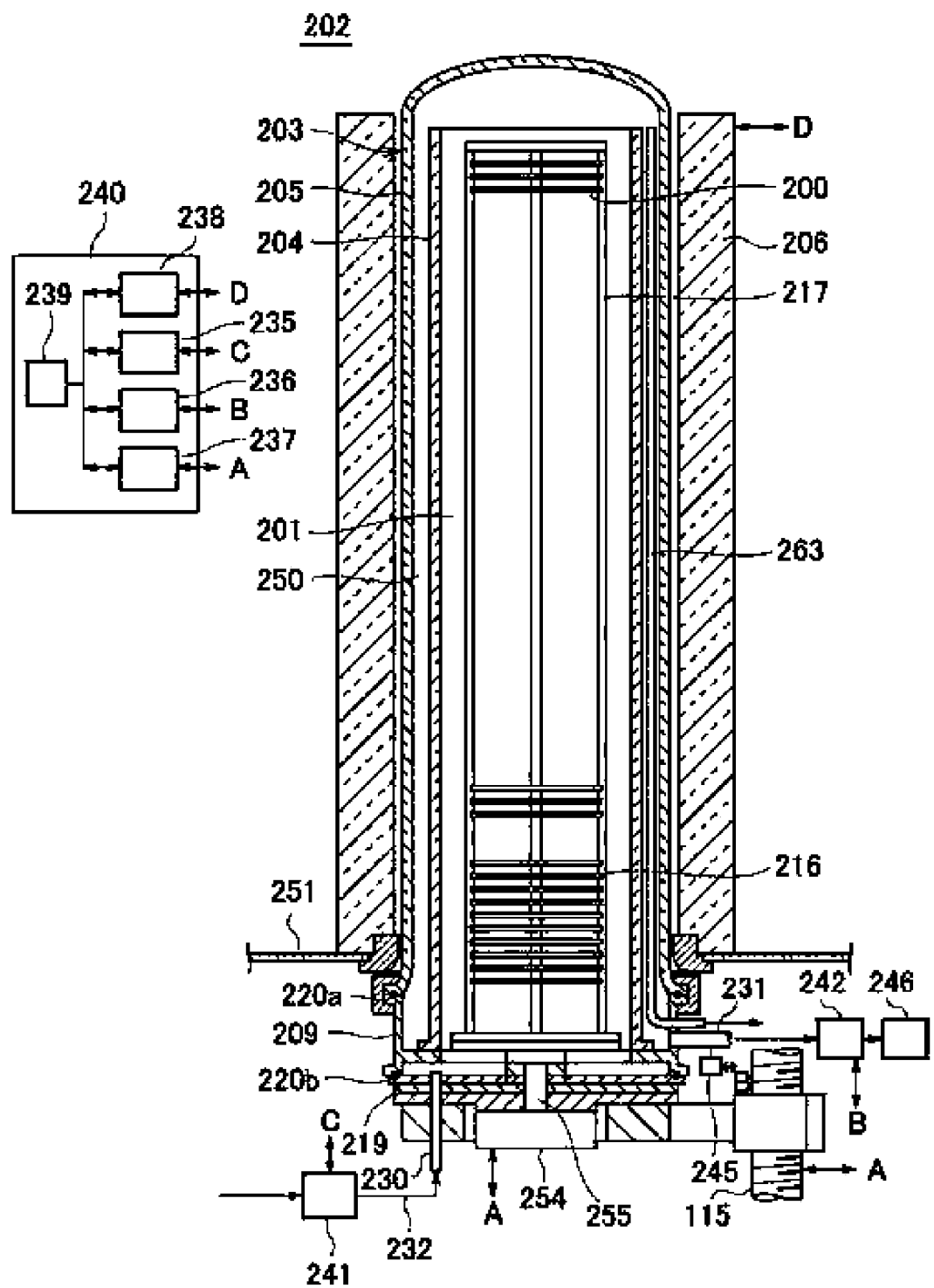
FIG. 11 is a longitudinal cross-sectional view of a process furnace included in a substrate processing apparatus according to an embodiment of the present invention.

The structure of the process furnace 202 according to the present embodiment will be described with reference to FIG. 11. FIG. 11 is a longitudinal cross-sectional view of the process furnace 202 included in the substrate processing apparatus 100 according to the present embodiment.

As illustrated in FIG. 11, the process furnace 202 includes a process tube 203 serving as a reaction tube. The process tube 203 includes an inner tube 204 serving as an inner reaction tube and an outer tube 205 serving as an outer reaction tube installed outside. The inner tube 204 is formed of, for example, a heat-resistant material such as quartz ($SiO_2$) or silicon carbide (SiC), and has a cylindrical shape, the top and bottom ends of which are open. In the inner tube 204, the process chamber 201 is formed in a hollow tubular portion to process the wafer 200 which is a substrate. The process chamber 201 is configured to accommodate the boat 217 which will be described in detail below. The outer tube 205 is installed concentrically with the inner tube 204. The outer tube 205 has a cylindrical shape, the internal diameter of which is greater than an external diameter of the inner tube 204, the top end of which is blocked and the bottom end of which is open. The outer tube 205 is formed of, for example, a heat-resistant material such as quartz, silicon carbide, or the like.

A heater 206 serving as a heating mechanism is installed to encompass side walls of the process tube 203 at external sides of the process tube 203. The heater 206 has a cylindrical shape and is vertically installed while being supported by a heater base 251 which is a retaining plate.

In the process tube 203, a temperature sensor 263 is installed as a temperature detector. The heater 206 and the temperature sensor 263 are electrically connected to a temperature controller 237. The temperature controller 237 is configured to control power to be supplied to the heater 206 such that temperature in the process chamber 201 has a desired temperature distribution at a desired timing, based on temperature information detected by the temperature sensor 263.

A manifold 209 is installed below the outer tube 205 to be concentrically formed with the outer tube 205. The manifold 209 is formed of, for example, stainless steel or the like, and has a cylindrical shape, the top and bottom ends of which are open. The manifold 209 is engaged with the bottom end of the inner tube 204 and the bottom end of the outer tube 205, and is installed to support the inner tube 204 and the outer tube 205. Also, an O-ring 220a serving as a seal member is installed between the manifold 209 and the outer tube 205. The process tube 203 and the manifold 209 form a reaction container together.

Below the manifold 209, the seal cap 219 is installed as a furnace port lid to air-tightly block a low end opening of the manifold 209. The seal cap 219 is formed to abut the bottom end of the manifold 209 from a lower side in the vertical direction. The seal cap 219 is formed of a metal such as stainless steel or the like, and has a disc shape. An O-ring 220b serving as a seal member configured to abut the bottom end of the manifold 209 is installed on a top surface of the seal cap 219. A rotary mechanism 267 configured to rotate the boat 217 serving as a substrate holder (to be described later) is installed at a side of the seal cap 219 opposite to the process chamber 201. The seal cap 219 is vertically moved upward/downward by the boat elevator 115 as an elevating mechanism vertically installed outside the process tube 203. By moving the seal cap 219 upward/downward, the boat 217 is configured to be transferred inside/outside the process chamber 201.

A rotary mechanism 254 configured to rotate the boat 217 is installed at a side near a central portion of the seal cap 219 and opposite to the process chamber 201. A rotary shaft 255 of the rotary mechanism 254 supports the boat 217 from a downward direction while passing through the seal cap 219. The rotary mechanism 254 is configured to rotate the wafer 200 by rotating the boat 217.

The rotary mechanism 254 and the boat elevator 115 are electrically connected to a transfer controller 238. The transfer controller 238 is configured to control the rotary mechanism 254 and the boat elevator 115 to perform desired operations at a desired timing. Also, the transfer controller 238 is electrically connected to the pod elevator 118a, the pod transfer mechanism 118b, the pod opener 121, the wafer transfer device 125a and the wafer transfer device elevator 125b described above to control these elements to perform desired operations at a desired timing. A transfer system according to the present embodiment mainly includes the pod elevator 118a, the pod transfer mechanism 118b, the pod opener 121, the wafer transfer device 125a and the wafer transfer device elevator 125b.

The boat 217 serving as a substrate retainer is configured to support a plurality of wafers 200 in a multi-stage by concentrically aligning the plurality of wafers 200 in a horizontal posture. The boat 217 is formed of, for example, a heat-resistant material such as quartz or silicon carbide. A plurality of insulating boards 216 formed of, for example, a heat resistant material (such as quartz, silicon carbide, or the like) and having a disc shape are arranged in a horizontal posture and a multi-stage under the boat 217 so that heat from the heater 206 cannot be easily transferred toward the manifold 209.

A nozzle 230 serving as a gas introduction unit is connected to the seal cap 219 to communicate inside the process chamber 201. An upstream end of the nozzle 230 is connected to a downstream end of a gas supply tube 232. One or multiple gas supply sources for a processing gas or an inert gas, a mass flow controller (MFC) 241 serving as a gas flow rate controller and at least one valve are installed the gas supply tube 232 in sequence from an upstream side. The MFC 241 is electrically connected to a gas flow rate controller 235. The gas flow rate controller 235 is configured to control the MFC 241 such that a gas supplied to the process chamber 201 has a desired flow rate at desired timing. A gas supply system according to the present embodiment mainly includes the nozzle 230, the gas supply tube 232, the MFC 241 and the valve. The gas supply system may further include the gas supply source.

On a side wall of the manifold 209, an exhaust pipe 231 is installed to exhaust an atmosphere in the process chamber 201. The exhaust pipe 231 is installed at a bottom end of a container-shaped space 250 formed by a gap between the inner tube 204 and the outer tube 205, and communicates with the container-shaped space 250. At the exhaust pipe 231, a pressure sensor 245 serving as a pressure detector (pressure detection unit) configured to detect pressure in the process chamber 201, a pressure adjustment device such as an auto pressure controller (APC) valve 242 and a vacuum pump 246 serving as a vacuum exhaust device are installed in sequence from an upstream side. The APC valve 242 and the pressure sensor 245 are electrically connected to a pressure controller 236. The pressure controller 236 is configured to control the APC valve 242 such that the process chamber 201 has a desired pressure level at a desired timing, based on a pressure value detected by the pressure sensor 245. A gas exhaust system mainly includes the exhaust pipe 231, the pressure sensor 245 and the APC valve 242. The gas exhaust system may further include the vacuum pump 246.

A controller 240 is configured to control the temperature controller 237 via a signal line A, the pressure controller 236 via the signal line B, the gas flow rate controller 235 via a signal line C, and the transfer controller 238 via a signal line D. The gas flow rate controller 235, the pressure controller 236, the temperature controller 237 and the transfer controller 238 form a part of the structure of the controller 240 for use in the substrate processing apparatus. The structure and operation of the controller 240 for use in the substrate processing apparatus will be described below.

(5) Operation of Process Furnace

A substrate processing process performed as a process included in a semiconductor manufacturing process using the process furnace 202 will now be described below. The substrate processing process is repeatedly performed based on a process recipe for performing a predetermined treatment on the wafer 200. The process recipe may include a plurality of steps. In the present embodiment, a film-forming process of forming a thin film on the wafer 200 will be described as an example of the substrate processing process performed based on a process recipe including a plurality of steps. In the following disclosure, operations of the elements of the substrate processing apparatus 100 are controlled by the controller 240 for use in the substrate processing apparatus.

Substrate Loading Process

First, a plurality of wafers 200 are loaded into the boat 217 (wafer loading), and the boat 217 retaining the plurality of wafers 200 is lifted by the boat elevator 115 to be loaded into the process chamber 201 (boat loading). In this state, the bottom end of the manifold 209 is sealed with the seal cap 219 having the O-ring 220b therebetween.

Pressure & Temperature Adjustment Process

The inside of the process chamber 201 is vacuum-exhausted by the vacuum pump 246 to have a desired pressure level (vacuum level). In this case, the pressure in the process chamber 201 is measured using the pressure sensor 245, and the degree of opening the APC valve 242 is feedback-controlled based on the measured pressure level (pressure control). Also, the inside of the process chamber 201 is heated to a desired temperature using the heater 206. In this case, the amount of power supplied to the heater 206 is feedback-controlled based on the temperature value detected by the temperature sensor 263 (temperature control). Next, rotation of the boat 217, i.e., rotation of the wafer 200, is started by the rotary mechanism 254. The pressure control, the temperature control, the rotation of the wafer 200 are continuously performed at least until a film-forming process which will be described below is completed.

Film-Forming Process

When the inside of the process chamber 201 reaches the desired pressure and the desired temperature, a processing gas is supplied into the process chamber 201 while controlling the flow rate of the processing gas with the MFC 241 by opening the valve installed at the gas supply tube 232. The processing gas supplied into the process chamber 201 rises within the process chamber 201, flows from a top end opening of the inner tube 204 into the container-shaped space 250, and is then exhausted via the exhaust pipe 231. When the processing gas passes through the process chamber 201, the processing gas contacts a surface of the wafer 200 to cause a thin film to be deposited on the surface of the wafer 200 due to a thermal CVD reaction. When a predetermined time period passes, the valve installed at the gas supply tube 232 is closed to suspend the supply of the processing gas into the process chamber 201.

Purging Process

After the supply of the processing gas into the process chamber 201 is suspended, an inert gas is supplied from the gas supply source included in the process chamber 201, thereby substituting the atmosphere in the process chamber 201 with the inert gas. Thus, a remnant gas or reaction byproducts remaining in the process chamber 201 are removed from the process chamber 201.

Atmospheric Pressure Recovery & Substrate Unloading Process

After the purging process is completed, the supply of the power to the heater 206 is suspended to lower the temperature in the process chamber 201, and the degree of opening of the APC valve 242 is controlled to return the pressure in the process chamber 201 to an atmospheric pressure (atmospheric pressure recovery). Then, the boat 217 is unloaded from the process chamber 201 in an order reverse to the order in which the substrate loading process described above was performed (boat unloading). Then, the processed wafer 200 is unloaded from the boat 217 (wafer unloading) and is stored in the pod 110, and the substrate processing process according to the present embodiment is completed.

(6) Structure of Controller for Use in Substrate Processing Apparatus

Figure 2:
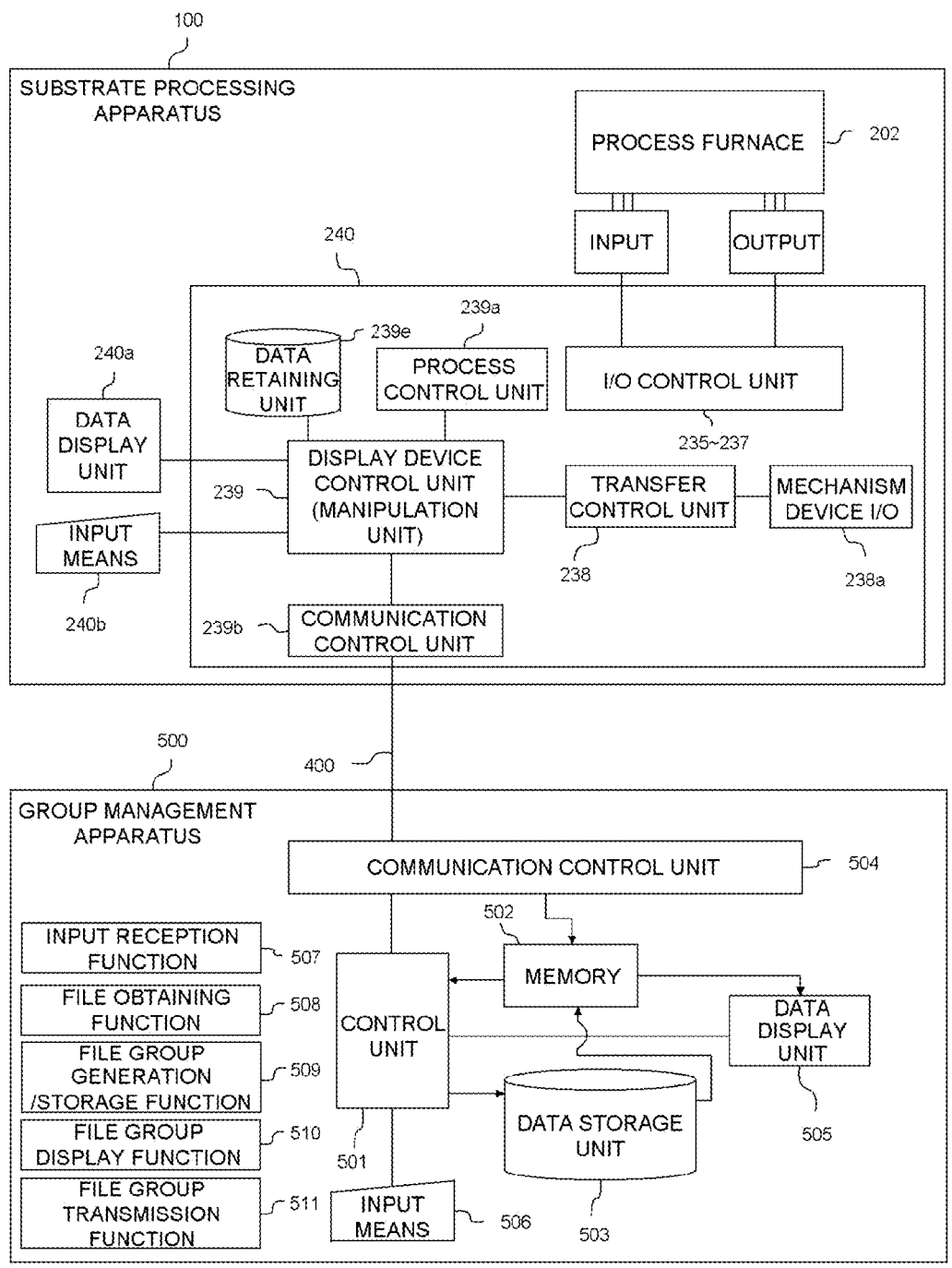
FIG. 2 is a block diagram of a substrate processing apparatus and a group management apparatus according to an embodiment of the present invention.

Next, the structure of the controller of the substrate processing apparatus 100 according to the present embodiment will be described with reference to FIG. 2. FIG. 2 is a block diagram of the substrate processing apparatus 100 and the group management apparatus 500 according to the present embodiment.

As described above, the substrate processing apparatus 100 is electrically connected to the controller 240. The controller 240 for use in the substrate processing apparatus is embodied as a computer that includes a display device controller 239 (manipulation unit) configured as a central processing unit (CPU), a process controller 239a, input/output (I/O) controllers 235 through 237, a transfer controller 238, a mechanism machine I/O 238a, a communication controller 239b serving as a communication unit, a data storage unit 239e, a data display unit 240a serving as a display unit such as a display device and an input unit 240b such as a keyboard. The process controller 239a, the transfer controller 238, the communication controller 239b, the data storage unit 239e, the data display unit 240a and the input unit 240b are configured to exchange data with the display device controller 239 via an internal bus.

Process Controller

The process controller 239a is connected to the I/O controllers 235 through 237 (the gas flow rate controller 235, the pressure controller 236 and the temperature controller 237) configured to control the process furnace 202 to exchange data therebetween. The process controller 239a is configured to not only control an operation of the process furnace 202 via the I/O controllers 235 through 237 but also collect (read) monitor data representing a state of the process furnace 202 (temperature, gas flow rate, pressure, etc.).

Transfer Controller

The transfer controller 238 is connected to the mechanism machine I/O 238a to exchange data with the mechanism machine I/O 238a. The mechanism machine I/O 238a is connected to the elements of the substrate processing apparatus 100 (e.g., the pod elevator 118a, the pod transfer mechanism 118b, the pod opener 121, the wafer transfer mechanism 125, the boat elevator 115, the rotary mechanism 254, etc.). The transfer controller 238 is configured to not only control operations of the elements of the substrate processing apparatus 100 via the mechanism machine I/O 238a but also collect (read) monitor data representing the states of the elements of the substrate processing apparatus 100 (e.g., location, an open/closed state, whether each of the elements is in an operating mode or a standby mode, etc.).

Data Storage Unit

In the data storage unit 239e, a control program for performing various functions of the controller 240 for use in the substrate processing apparatus is stored. In the data storage unit 239e, the monitor data read from, for example, the I/O controllers 235 to 237 (the gas flow rate controller 235, the pressure controller 236, and the temperature controller 237) or the transfer controller 238 is further stored to be readable. The data storage unit 239e is embodied as, for example, a flash memory, a hard disk memory (HDD), an electrically erasable and programmable read only memory (EEPROM), etc.

In the data storage unit 239e, a configuration file 280 and at least one associated file 281 related to the configuration file 280 (hereinafter also referred to simply as 'associated file 281') are further stored to be readable. The configuration file 280 is, for example, a process recipe file that defines process conditions and order of a substrate processing process performed by the process furnace 202 (see FIG. 3). The associated file 281 related to the configuration file 280 includes, for example, a sub-recipe file containing a sub-recipe, a temperature control parameter file containing a proportional integral derivative (PID) table for performing temperature control, a pressure control parameter file containing a proportional integral derivative (PID) table for performing pressure control, or a transfer parameter file containing transfer parameters (see FIG. 3).

In general, in order to perform the process recipe, the content of the configuration file 280 (process recipe file) and the contents of all the associated file 281 related to the configuration file 280 (process recipe file) need to be read. For example, in the present embodiment, the process recipe may be performed by reading the configuration file 280 (process recipe file) and all the associated file 281 such as the sub-recipe file, the temperature control parameter file, the pressure control parameter file and the transfer parameter file. The number of the associated file 281 related to the configuration file 280 is not limited to four and may be variously determined according to the configuration file 280. In other words, the number of the associated file 281 related to the configuration file 280 may be three or less or five or more.

Figure 3:
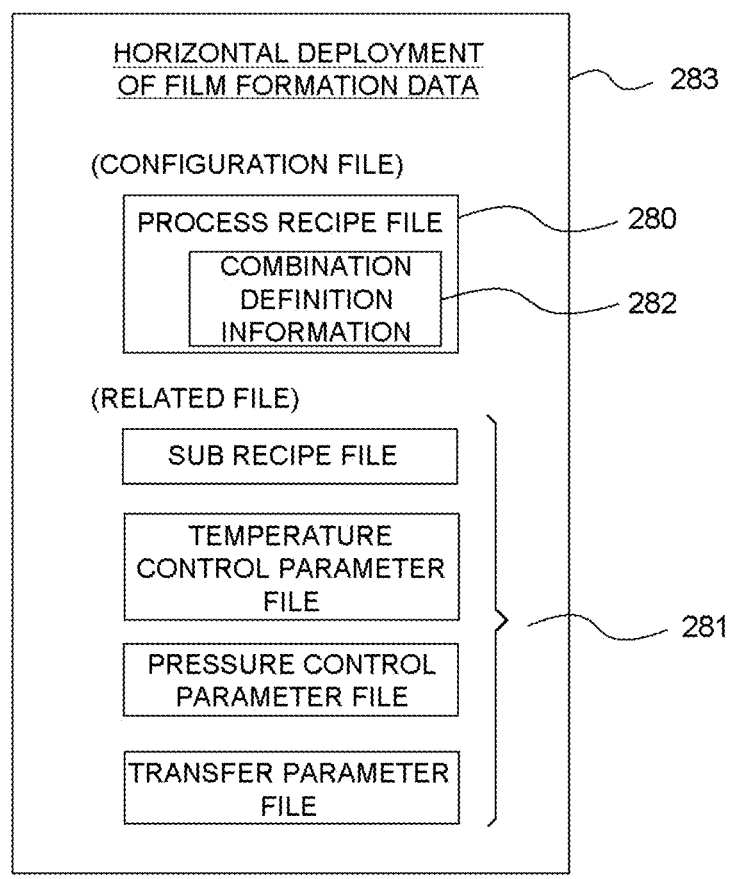
FIG. 3 is a conceptual diagram illustrating the content of a file group (a combination file) generated by a group management apparatus according to an embodiment of the present invention.

In the configuration file 280, combination information 282 that shows the combination of the associated file 281 related to the configuration file is contained. The combination information 282 displays all the associated file 281 related to the configuration file 280. That is, in the present embodiment, the combination information 282 displays information specifying all the associated file 281 such as the sub-recipe file, the temperature control parameter file, the pressure control parameter file and the transfer parameter file, as illustrated in FIG. 3.

Also, the process recipe or the sub-recipe described above is a result of combining sequences of the substrate processing process such that a desired result is obtained by performing the substrate processing process by the controller 240 for use in a substrate processing apparatus. When the controller 240 for use in the substrate processing apparatus performs a control program, the process recipe file as the configuration recipe 280 and all the associated file 281 such as the sub-recipe file, the temperature control parameter file, the pressure control parameter file and the transfer parameter file are read to perform the steps of the process recipe or the sub-recipe. Hereinafter, the process recipe or the control program is collectively referred to simply as a program.

Communication Controller

The communication controller 239*b* is configured to receive monitor data which represents the state of the process furnace 202 (temperature, gas flow rate, pressure, etc.) and is read via the I/O controllers 235 to 237 (the gas flow rate controller 235, the pressure controller 236 and the temperature controller 237), via the process controller 239*a* and the display device controller 239, and to transmit the monitor data to the group management apparatus 500. Also, the communication controller 239*b* is configured to receive monitor data, which represents the states of the elements of the substrate processing apparatus 100 (location, an open/closed state, whether each of the elements is in the operating mode or the standby mode, etc.) and is read via the mechanism machine I/O 238*a*, via the transfer controller 238 and the display device controller 239, and to transmit the monitor data to the group management apparatus 500. Also, the communication controller 239*b* is connected to the group management apparatus 500, which will be described in detail below, via the network 400 to exchange data with the group management apparatus 500.

Display Device Controller

The display device controller 239 is configured to read the control program from the data storage unit 239*e* and execute the control program. When the display device controller 239 is configured to receive a command, such as a command for generating a file group, from the input unit 240*b* and to read, for example, a process recipe from the data storage unit 239*e* according to the command. Then, the display device controller 239 is configured to control the gas flow rate controller 235 to perform gas flow rate adjustment, the pressure controller 236 to perform pressure adjustment and the temperature controller 237 to perform temperature adjustment, based on the content of the read process recipe.

Also, for example, when a command from the input unit 240*b* is input to the display device controller 239 by an operator, the display device controller 239 is configured to display a screen image representing the state of the substrate processing apparatus 100 or representing that the input is received, on the data display unit 240*a*.

Also, the display device controller 239 is configured to perform the following functions by reading the control program from the data storage unit 239*e* and executing the control program. That is, the display device controller 239 is configured to receive a request to transmit the configuration file 280 or the at least one associated file 281 from the group management apparatus 500 which will be described in detail below via the communication controller 239*b*. Also, the display device controller 239 is configured to obtain the requested configuration file 280 or at least one associated file 281 from the data storage unit 239*e* and transmit the obtained configuration file 280 and at least one associated file 281 to the group management apparatus 500 via the communication controller 239*b*.

(7) Structure of Group Management Apparatus

Next, the structure of the group management apparatus 500 according to the present embodiment configured to exchange data with the substrate processing apparatus 100 will be described mainly with reference to FIGS. 2 through 7.

As illustrated in FIG. 2, the group management apparatus 500 is embodied as a computer that includes a controller 501 configured as a CPU, a memory 502 (random access memory (RAM)) including a common memory region therein, a data storage unit 503 serving as a memory device, e.g., a flash memory, an HDD, an EEPROM, etc., a data display unit 505 serving as a display unit such as a display device, an input unit 506 such as a keyboard and a communication controller 504 serving as a communication unit. The memory 502, the data storage unit 503, the data display unit 505, the input unit 506, and the communication controller 504 are configured to exchange data with the controller 501 via an internal bus.

As described above, the communication controller 504 is connected to the communication controller 239*b* of the controller 240 for use in the substrate processing apparatus to exchange data with the communication controller 239*b* via the network 400. The communication controller 504 is configured to receive data from the substrate processing apparatus 100, transmit the data to the memory 502 and transmit the data stored in the memory 502 to the substrate processing apparatus 100. Examples of the data transmitted to the memory 502 include monitor data received from the I/O controllers 235 through 237 (the gas flow rate controller 235, the pressure controller 236 and the temperature controller 237) or the mechanism machine I/O 238*a*, the configuration file 280, the associated file 281, etc. The communication controller 504 may receive data from the substrate processing apparatus 100 at timing when a command is received from, for example, the input unit 506, etc.

In the data storage unit 503, various group management programs are stored. The controller 501 is configured to perform an input reception unit 507, a file obtaining unit 508, a file group generation/storage unit 509, a file group display unit 510, a file group transmission unit 511, etc., which will be described below, by reading and executing a group management program stored in the data storage unit 503.

Input Reception Function

Figure 4:
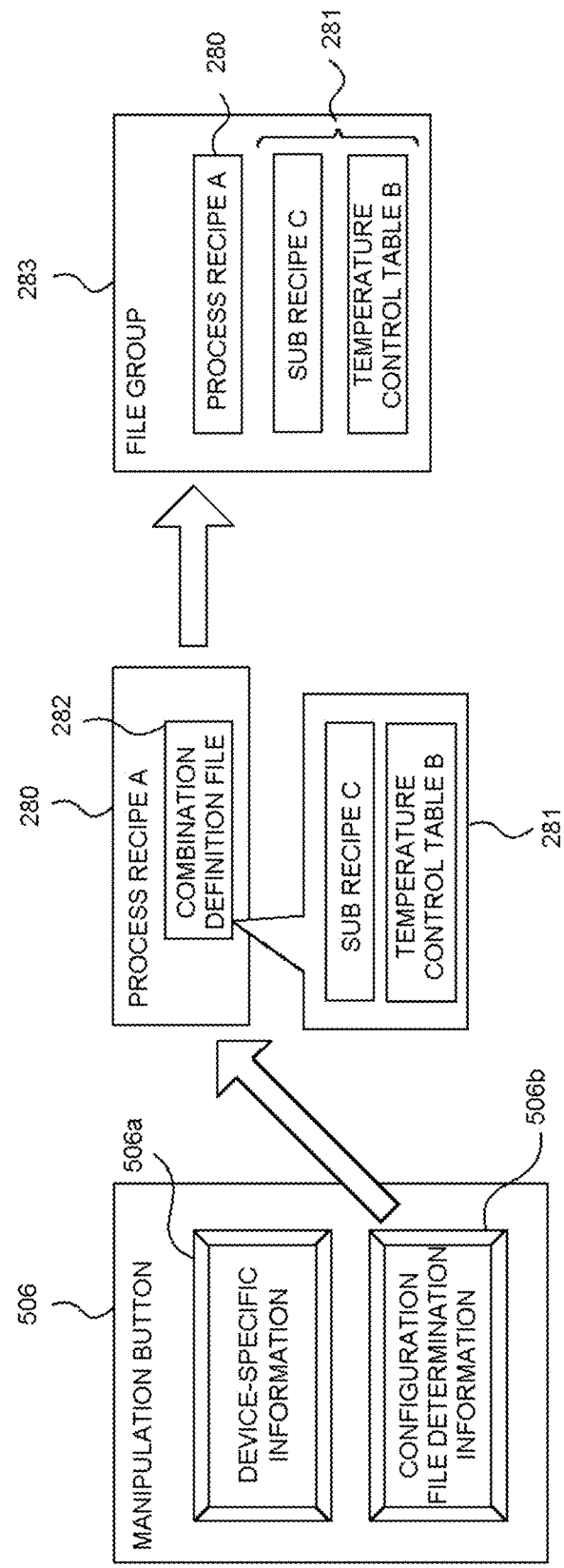
FIG. 4 is a conceptual diagram illustrating a process of generating a file group (a combination file) by a group management apparatus according to an embodiment of the present invention.
Figure 5:
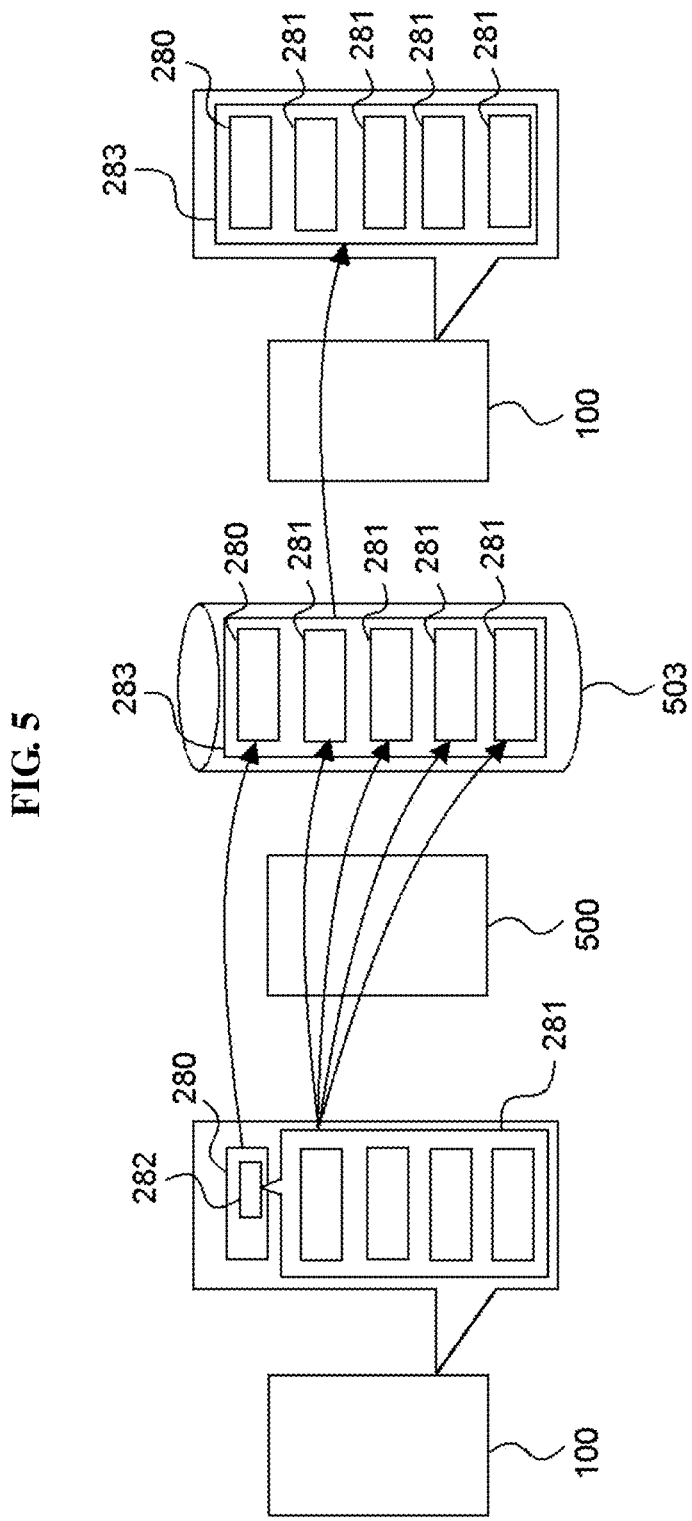
FIG. 5 is a conceptual diagram illustrating a process of obtaining files and generating and transmitting a file group (a combination file) by a group management apparatus according to an embodiment of the present invention.

As illustrated in FIGS. 2, 4 and 5, through the input reception unit 507, for example, device-specific information or buttons 506*a* and 506*b* for determining the configuration file 280 (see FIG. 4) are displayed, and device-specific information specifying the substrate processing apparatus 100 and a command to obtain the configuration file 280 from the specified substrate processing apparatus 100 are received from the input unit 506. For example, when an operator presses the button 506a, at least the device-specific information specifying the substrate processing apparatus 100 which is a file transmission site and information specifying the configuration file 280 are received. When the operator presses the button 506b, at least not only the device-specific information specifying the substrate processing apparatus 100 which is a file transmission site and the information specifying the configuration file 280 but also a command to generate a set of files (file group) including the configuration file 280 and the associated file 281 related to the configuration file 280 are received. A plurality of configuration files 280 may be used in this case.

File Obtaining Function

Through the file obtaining unit 508, a request to transmit the configuration file 280 is transmitted to the substrate processing apparatus 100 when the combination file (file group) generation command is received from the input unit 506 using the input reception unit 507. Through the file obtaining unit 508, the configuration file 280 is obtained by receiving the configuration file 280 from the substrate processing apparatus 100, and the configuration file 280 is stored in the memory 502 or the data storage unit 503.

Also, through the file obtaining unit 508, a combination information 282 contained in the configuration file 280 is automatically read, and a request to transmit the associated file 281 displayed in the read combination information 282 is transmitted to the substrate processing apparatus 100. Then, through the file obtaining unit 508, the associated file 281 is received and obtained from the substrate processing apparatus 100, and is stored in the memory 502 or the data storage unit 503. That is, by using the file obtaining unit 508, all the associated file 281 related to the configuration file 280 is automatically obtained from the substrate processing apparatus 100.

File Group Generation/Storage Function

Through the file group generation/storage unit 509, a file group 283 is generated by summarizing a plurality of configuration files 280 obtained from the substrate processing apparatus 100 as one assembly or by including one configuration file 280 and all the associated file 281 related to the configuration file 280 as a combination file, and is then output to and stored in the data storage unit 503 to be readable.

File Group Display Function

Through the file group display unit 510, the configuration file 280 and the associated file 281 included in the file group 283 read from the data storage unit 503 are displayed on the data display unit 505. That is, for example, as illustrated in FIG. 3, through the file group display unit 510, the file names of the file group 283, the configuration file 280 and the associated file 281 may further be displayed on the data display unit 505. Also, through the file group display unit 510, the name of the substrate processing apparatus 100 which is a source of the configuration file 280 and the associated file 281 and various parameters included in the configuration file 280 and the associated file 281 may further be displayed. Also, through the file group display unit 510, the content of the configuration file 280 (e.g., conditions of processing the process recipe) and the content of the associated file 281 (e.g., a temperature control table included in the temperature control parameter file or a predetermined parameter value) may further be displayed on the data display unit 505.

Figure 7:
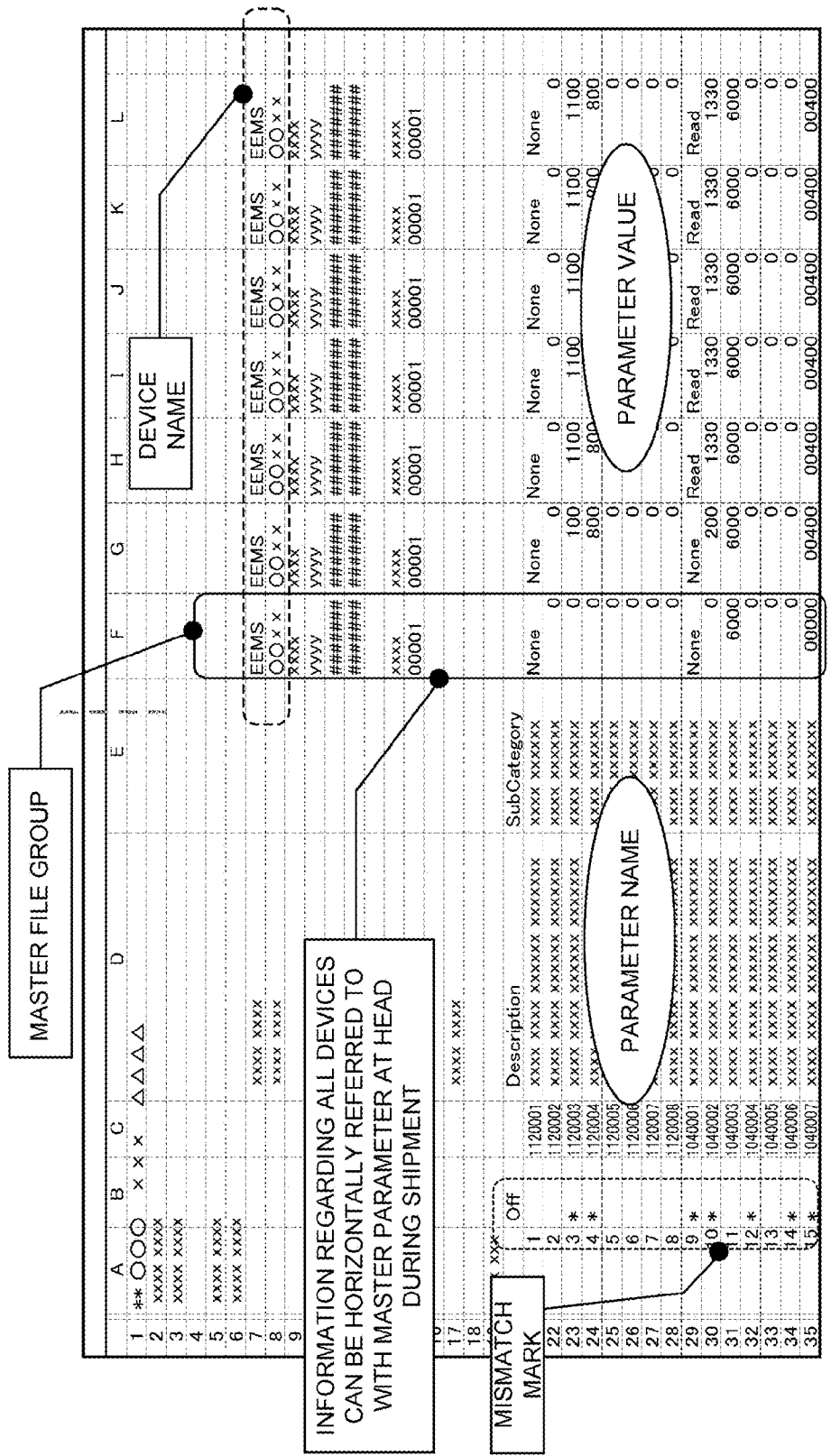
FIG. 7 is a schematic diagram of a screen image displayed on a data display unit of a group management apparatus according to an embodiment of the present invention.

Also, for example, as illustrated in FIG. 7, through the file group display unit 510, when at least two file groups 283 are displayed on the data display unit 505, one of the at least two file groups 283 may be displayed as a master file group serving as a reference of comparison. For example, a file group during shipment of a product may be set as a master file group and be first displayed, and a file group 283 including a configuration file 280 and the associated file 281 obtained from each of a plurality of substrate processing apparatuses 100 used to manufacture the product may be displayed together with the master file group.

Also, as illustrated in FIG. 7, through the file group display unit 510, at least two file groups 283 may be displayed on the data display unit 505 such that different points between the at least two file groups 283 are indicated. That is, through the file group display unit 510, at least two file groups 283 may be displayed on the data display unit 505 such that, for example, a mismatch mark is assigned to a file having a different number of associated files 281 or having different factors included in the associated files 281, such as a predetermined parameter value, among the at least two file groups 283.

Figure 6:
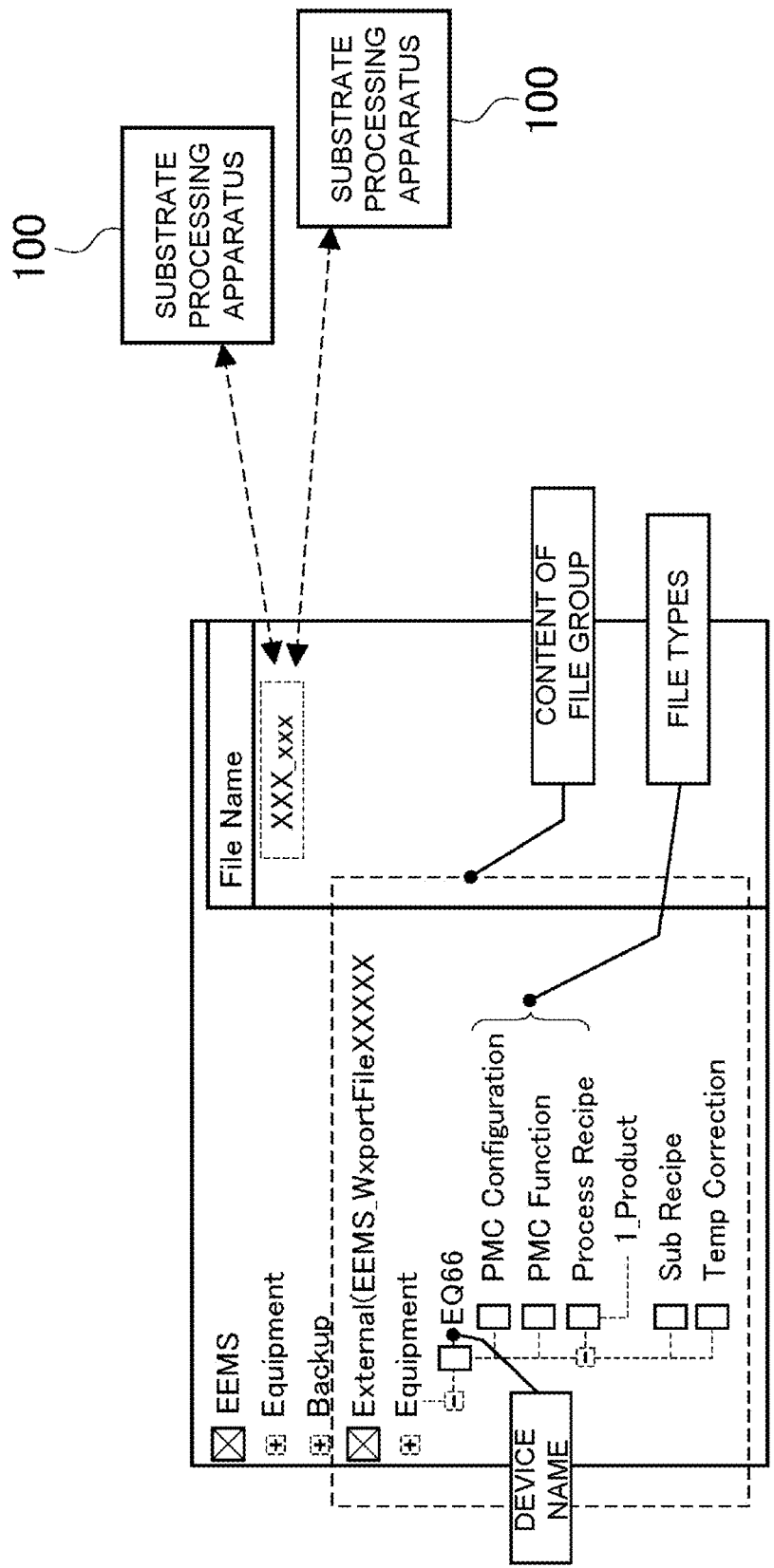
FIG. 6 is a schematic diagram of a screen image displayed on a data display unit of a group management apparatus according to an embodiment of the present invention.

Also, as illustrated in FIG. 6, through the file group display unit 510, the configuration files 280 and the associated files 281 included in the file group 283 may be displayed, for example, in a tree format.

Also, as illustrated in FIG. 6, through the file group display unit 510, the content of the file group 283 that is exported is displayed and the name (device name) of the substrate processing apparatus 100 which is a source of files are displayed together according to file types. As described above, the tree format is convenient in selecting a desired file.

File Group Transmission Function

When, through the input reception unit 507, not only the device-specific information specifying the substrate processing apparatus 100 which is a file transmission site but also a command for generating a file group obtained by summarizing a plurality of configuration files 280 in one file or a command to generate a combination file (file group) including the configuration file 280 and the associated file 281 related to the configuration file 280 are received from the input unit 506 (button 506b), the file group 283 is detected and read from the data storage unit 503 through the file group transmission unit 511. Also, through the file group transmission unit 511, the file group 283 read from the data storage unit 503 is transmitted at once in the form of a file group to a predetermined substrate processing apparatus 100.

(8) Operation of Group Management Apparatus

Next, an operation of the group management apparatus 500 according to the present embodiment will be described mainly reference to FIGS. 2, 4 and 5. The operation of the group management apparatus 500 is performed as a process included in a semiconductor device manufacturing process.

Input Reception Process

As illustrated in FIGS. 2, 4 and 5, for example, when an operator presses the buttons 506a and 506b, device-specific information specifying the substrate processing apparatus 100 and configuration file-specific information specifying the configuration file 280 stored in the substrate processing apparatus 100 are received from the input unit 506 through the input reception unit 507 of the group management apparatus 500.

File Obtaining Process

When the input unit 506 receives the device-specific information and the configuration file-specific information, a request to transmit the configuration file 280 specified with the configuration file-specific information is transmitted to the predetermined substrate processing apparatus 100, through the file obtaining unit 508 of the group management apparatus 500. Then, through the file obtaining unit 508, the configuration file 280 specified with the configuration file-specific information is received and obtained from the predetermined substrate processing apparatus 100 via the communication controller 504. Through the file obtaining unit 508, the combination information 282 included in the obtained configuration file 280 is automatically read, and a request to transmit all the associated file 281 indicated in the combination information 282 is transmitted to the predetermined substrate processing apparatus 100. Then, through the file obtaining unit 508, all the associated file 281 is automatically received and obtained from the predetermined substrate processing apparatus 100 via the communication controller 504.

File Group Generation/Storage Process

When, through the file obtaining unit 508, either a plurality of configuration files 280 or a configuration file 280 and all the associated file 281 related to the configuration file 280 are obtained from the predetermined substrate processing apparatus 100, a file group 283 is generated based on the obtained configuration files 280 or the obtained configuration file 280 and all the associated file 281, and is outputted to and stored in the data storage unit 503 to be readable through the file group generation/storage unit 509.

File Group Displaying Process

When, through the input reception unit 507, a command to generate a combination file (file group) is received, the file group 283 is detected from the data storage unit 503 and is read, and the configuration file 280 and the associated file 281 included in the file group 283 are displayed on the data display unit 505 through the file group display unit 510.

File Group Transmission Process

When, through the input reception unit 507, a command to transmit the file group 283 is received, the file group is detected and read from the data storage unit 503 and is transmitted at once in the form of a file group to the predetermined substrate processing apparatus 100 through the file group transmission function 512. Also, when device-specific information and information specifying the configuration file 280 are received by, for example, pressing the button 506a through the input reception unit 507, a file group 283 is generated based on the configuration file 280 and the file group 283 may be transmitted to the predetermined substrate processing apparatus 100 based on the device-specific information through the file group transmission function 512. Also, when the device-specific information and the information specifying the configuration file 280 are received, for example, by pressing the button 506b through the input reception unit 507, the associated file 281 is obtained from the selected configuration file 280, the file group 283 including the configuration file 280 and the associated file 281 is generated, and the file group 283 may be transmitted to the predetermined substrate processing apparatus 100 based on the device-specific information, through the file group transmission function 512.

(9) Effects of the Present Embodiment

According to the present embodiment, one or more effects are achieved as follows:

(a) According to the present embodiment, when the group management apparatus 500 receives device-specific information specifying the substrate processing apparatus 100 and information specifying the configuration file 280, the group management apparatus 500 may automatically obtain the configuration file 280 from the substrate processing apparatus 100. Also, the group management apparatus 500 may automatically read the combination information 282 included in the configuration file 280 obtained from the substrate processing apparatus 100 and automatically obtain all the associated file 281 indicated in the combination information 282 from the substrate processing apparatus 100. Also, the group management apparatus 500 may generate the file group 283 based on the configuration file 280 and the associated file 281 obtained from the substrate processing apparatus 100, and store the file group 283 that can be outputted. Thus, the associated file 281 related to the configuration file 280 may be prevented from being omitted in acquisition. Also, an associated file 281 that is not related to the configuration file 280 may be prevented from being mistakenly obtained. Also, an operator may only input the device-specific information and the information specifying the configuration file 280, thereby reducing the workload on the operator.

(b) According to the present embodiment, the group management apparatus 500 may display the configuration file 280 and the associated file 281 included in the file group 283 on the data display unit 505. Thus, the state of the substrate processing apparatus 100 may be easily analyzed, thereby exactly figuring out the state of substrate processing apparatus 100.

(c) According to the present embodiment, the group management apparatus 500 may read at least two file groups 283 from the data storage unit 503, and display configuration files 280 and associated files 281 included in the respective at least two file groups 283 such that they can be compared with one another.

For example, the group management apparatus 500 may display a file group 283 that includes a configuration file 280 including a process recipe having a desired result and the associated file 281 related to a configuration file 280 and at least one different file group 283 such that these file groups are displayed side by side. Thus, an operator may easily compare configuration files 280 or associated files 281 included in a plurality of file groups 283 with one another. Thus, the operator may easily detect different points between file groups 283, for example, the number of associated files 281 included in the file group 283 or predetermined parameter values in the respective associated files 281. As a result, the throughput of substrate processing may be increased, thereby improving the quality of substrate processing.

Also, for example, a file group 283 that includes a configuration file 280 and the associated file 281 obtained from one substrate processing apparatus 100 and a file group 283 that includes a configuration file 280 and the associated file 281 obtained from another substrate processing apparatus 100 may be displayed side by side. Thus, an operator may easily compare configuration files 280 and associated files 281 included in the file groups 283 stored in a plurality of substrate processing apparatuses 100. Thus, the state of each of the plurality of substrate processing apparatuses 100 may be easily analyzed. As a result, the operator may exactly determine the state of each of the plurality of substrate processing apparatuses 100, and appropriately manage the differences between the plurality of substrate processing apparatuses.

Also, for example, a file group 283 including a configuration file 280 and at least one associated file 281 of a substrate processing apparatus 100 before maintenance and a file group 283 including a configuration file 280 and at least one associated file 281 of the substrate processing apparatus 100 after maintenance are displayed side by side. Thus, an operator may easily compare the configuration file 280 and the associated files 281 of the respective file groups 283 of the substrate processing apparatus 100 before and after maintenance. In other words, the states of the substrate processing apparatus 100 before and after maintenance may be easily analyzed. Thus, for example, since an operator is able to easily detect an associated file 281 in which a predetermined parameter value changes through maintenance, an accident that may occur due to the predetermined parameter value may be prevented beforehand.

Also, for example, a file group 283 including a configuration file 280 and at least one associated file 281 when a product that has been newly shipped to the market is manufactured and a file group 283 including a configuration file 280 and at least one associated file 281 when a product that was previously shipped to the market is manufactured are displayed side by side. Accordingly, the product that has been newly shipped to the market and the product that was previously shipped to the market may be exactly analyzed and detected.

(d) According to the present embodiment, when at least two file groups 283 are displayed on the data display unit 505 to be compared with each other, one of the at least two file groups 283 may be displayed as a master file group serving as a reference of comparison. Thus, even when, for example, a plurality of file groups 283 are displayed on the data display unit 505, an operator may easily compare configuration files 280 and associated files 281 in the plurality of respective file groups 283.

(e) According to the present embodiment, the group management apparatus 500 may display the contents of a configuration file 280 and an associated file 281 included in a file group 283, for example, in the tree format. Thus, even if the number of associated files 281 related to the configuration file 280 is large, the locations of the associated files 281 may be easily detected. Accordingly, the workload on the operator may be lowered and the work efficiency may be increased.

(f) According to the present embodiment, a file group 283 including a configuration file 280 and at least one associated file 281 obtained from one substrate processing apparatus 100 may be transmitted to another substrate processing apparatus 100. In other words, the configuration file 280 and the associated file 281 are generated in the form of the file group 283 which is a file assembly. Accordingly, an omission may be prevented from occurring during transmission of the associated file 281.

Figure 12:
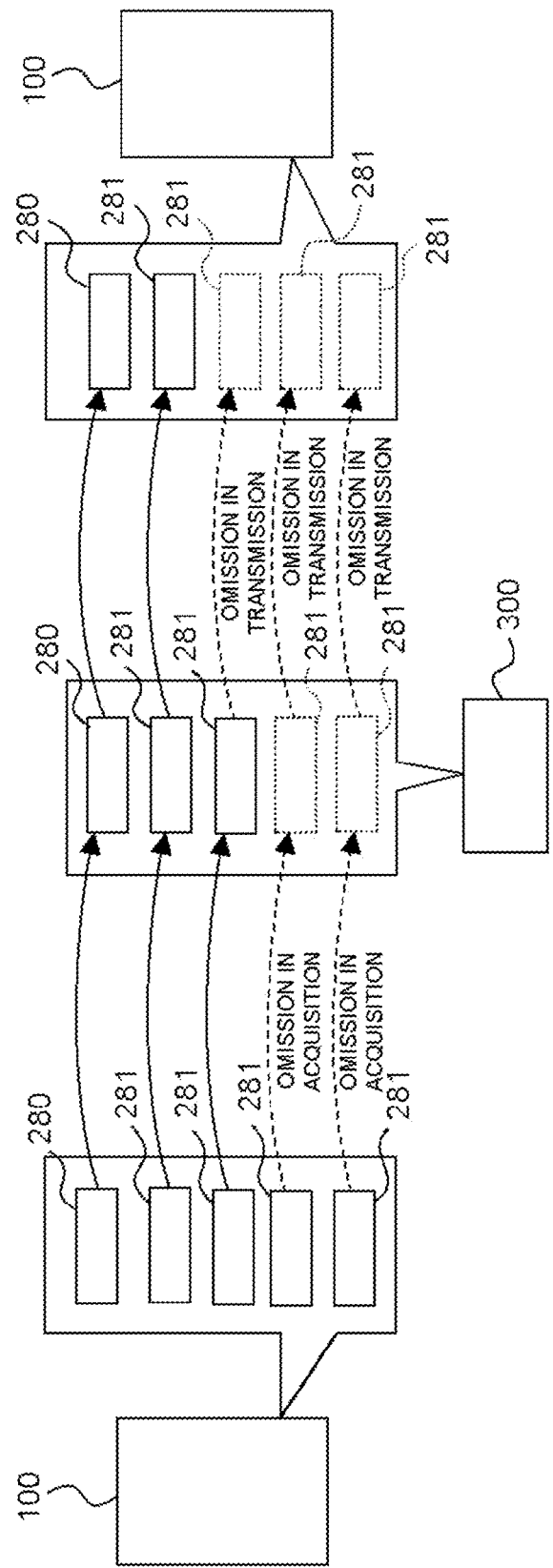
FIG. 12 is a conceptual diagram illustrating an omission occurring in obtaining files from a conventional group management apparatus.

For reference, a conventional method of obtaining a configuration file 280' and at least one associated file 281' related to the configuration file 280' will now be described with reference to FIG. 12. Conventionally, for example, an operator manually obtains the configuration file 280' and the associated file 281' via a work terminal 300 connected to a substrate processing apparatus 100 to exchange data with the substrate processing apparatus 100. Thus, as illustrated in FIG. 12, there is a case in which a desired associated file 281' is missing in file acquisition due to the operator's mistake. Also, even when the configuration file 280' and the associated file 281' are transmitted from one substrate processing apparatus 100 to another substrate processing apparatus 100 via the work terminal 300, the operator manually transmit these files. Thus, the configuration file 280' or the associated file 281' may be missing during the transmission due to the operator's mistake. To solve this problem, according to the present embodiment, the group management apparatus 500 is configured to automatically obtain a configuration file 280 and at least one associated file 281 related to the configuration file 280 from one substrate processing apparatus 100. Also, the group management apparatus 500 is configured to generate and store a file group 283 including the configuration file 280 and all the associated file 281 related to the configuration file 280. Accordingly, the problem may be effectively solved.

In the above one or more embodiments, a case in which the combination information 282 is included in the configuration file 280 has been described above but the present invention is not limited thereto. For example, the substrate processing apparatus 100 may store a combination definition file including the combination information 282 separately from the configuration file 280 and the associated file 281. That is, when the group management apparatus 500 receives the configuration file 280 and information specifying a combination definition file, all associated files 281 read based on the configuration file 280 specified with configuration file-specific information and the combination information 282 specified with combination definition file-specific information may be received from the substrate processing apparatus 100.

Figure 8A:
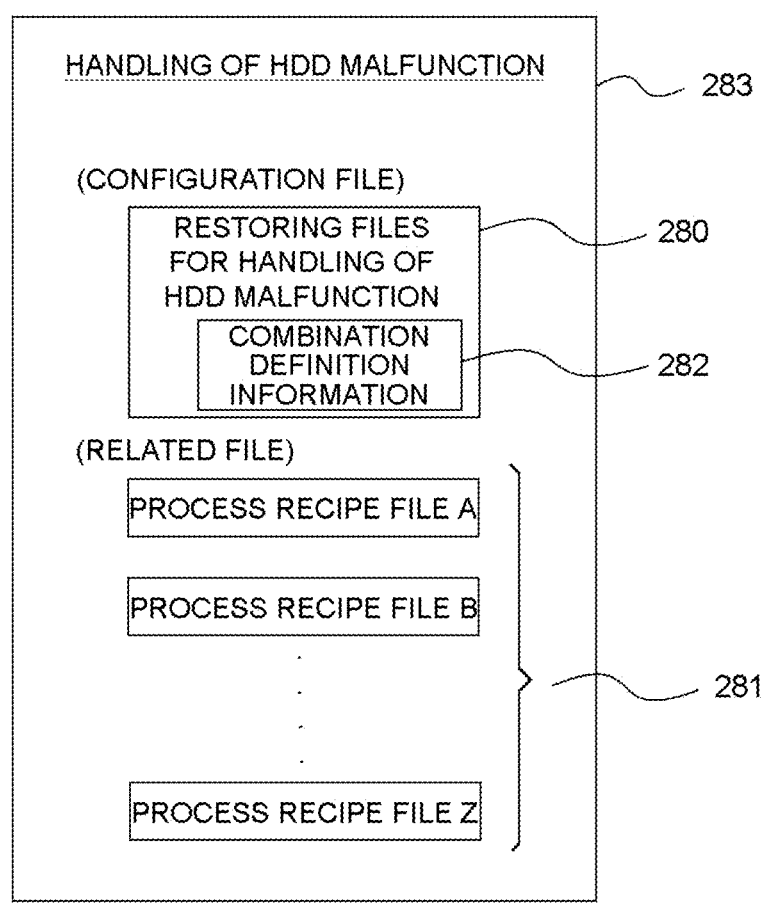
FIGS. 8A and 8B are conceptual diagrams of a file group (a combination file) generated by a group management apparatus according to an embodiment of the present invention.
Figure 8B:
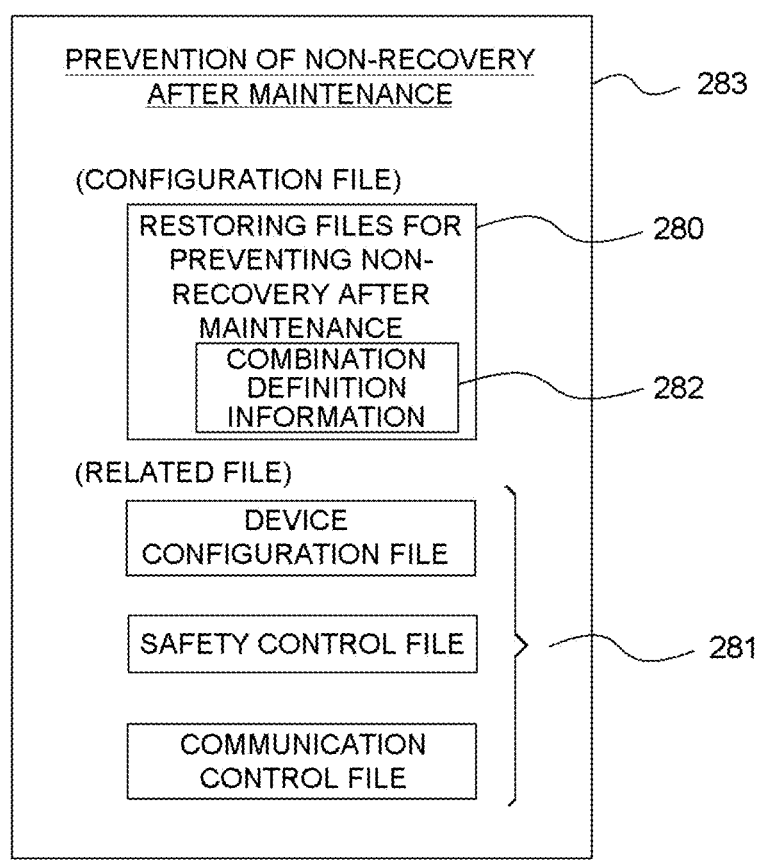

In the above one or more embodiments, cases in which a configuration file 280 is a process recipe file and associated files 281 are a sub-recipe file, a temperature control parameter file, a pressure control parameter file and a transfer parameter file have been described above, but the present invention is not limited thereto. That is, various file groups 283 may be achieved by changing a combination of the configuration file 280 and the associated files 281 according to a use. For example, as illustrated in FIG. 8A, a configuration file 280 may be a restoring file for handling a malfunction of an HDD, and the associated files 281 may be various process recipe files stored in one substrate processing apparatus 100 (e.g., a process recipe file A, a process recipe file B, . . . , a process recipe file Z). Thus, for example, a recovery process may be performed within a short time when an HDD malfunctions. Also, for example, as illustrated in FIG. 8B, a configuration file 280 may be a restoring file for preventing a non-recovery after maintenance, and associated files 281 may be a device configuration file describing device configuration before maintenance, a safety control file describing safety control parameters and a communication control file describing communication parameters. Thus, for example, a predetermined parameter value, etc., may be restored to a state before maintenance by simply transmitting a file group 283 including the device configuration file, the safety control file and the communication control file before maintenance to the original substrate processing apparatus 100 after maintenance. Accordingly, for example, an accident that may occur when the predetermined parameter value is not recovered (i.e., when the predetermined parameter value is not recovered) may be prevented beforehand.

Also, although in the above one or more embodiments, the content of the file group 283 is displayed on the data display unit 505 of the group management apparatus 500, the present invention is not limited thereto. In addition, for example, the content of the file group 283 may be displayed on the data display unit 240a of the substrate processing apparatus 100. Also, for example, the content of the file group 283 may be displayed on the data display unit 505 of the group management apparatus 500 and the data display unit 240a of the substrate processing apparatus 100.

Alternative Embodiment Of The Present Invention

Although various embodiments of the present invention have been described above in detail, various changes in form and details may be made without departing from the spirit and scope of the invention as defined by the appended claims. An embodiment of the present invention configured in which files (associated files 281) related to one file (configuration file 280) do not need to be automatically obtained from a substrate processing apparatus 100 will now be described below.

Figure 13:
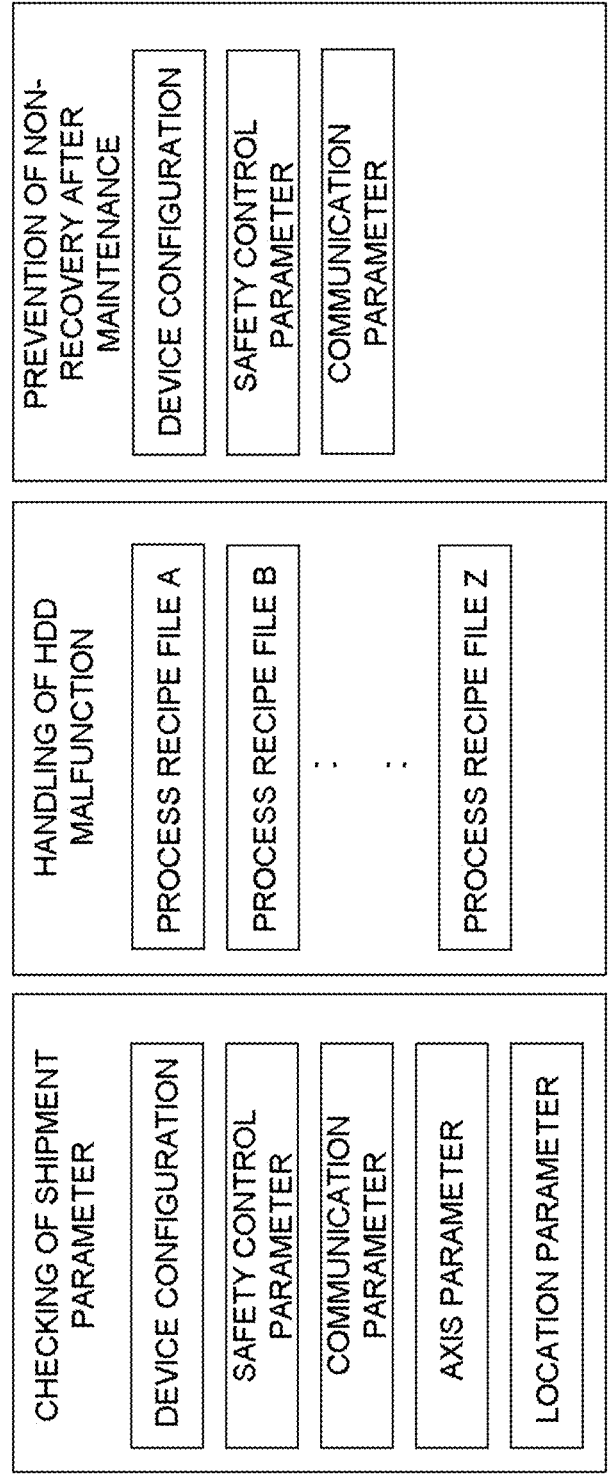
FIG. 13 is a conceptual diagram of a file group (a combination file) generated by a group management apparatus according to an alternative embodiment of the present invention.

FIG. 13 is a conceptual diagram of examples of a file group 383 classified as export files according to a use. According to an alternative embodiment of the present invention, the file group 383 is used according to three usages. As illustrated in FIG. 13, a file group 383 for checking shipment parameters, a file group 383 for handling a malfunction of an HDD, and a file group 383 for preventing a non-recovery after maintenance will be described below.

Alternative Embodiment 1

Figure 14:
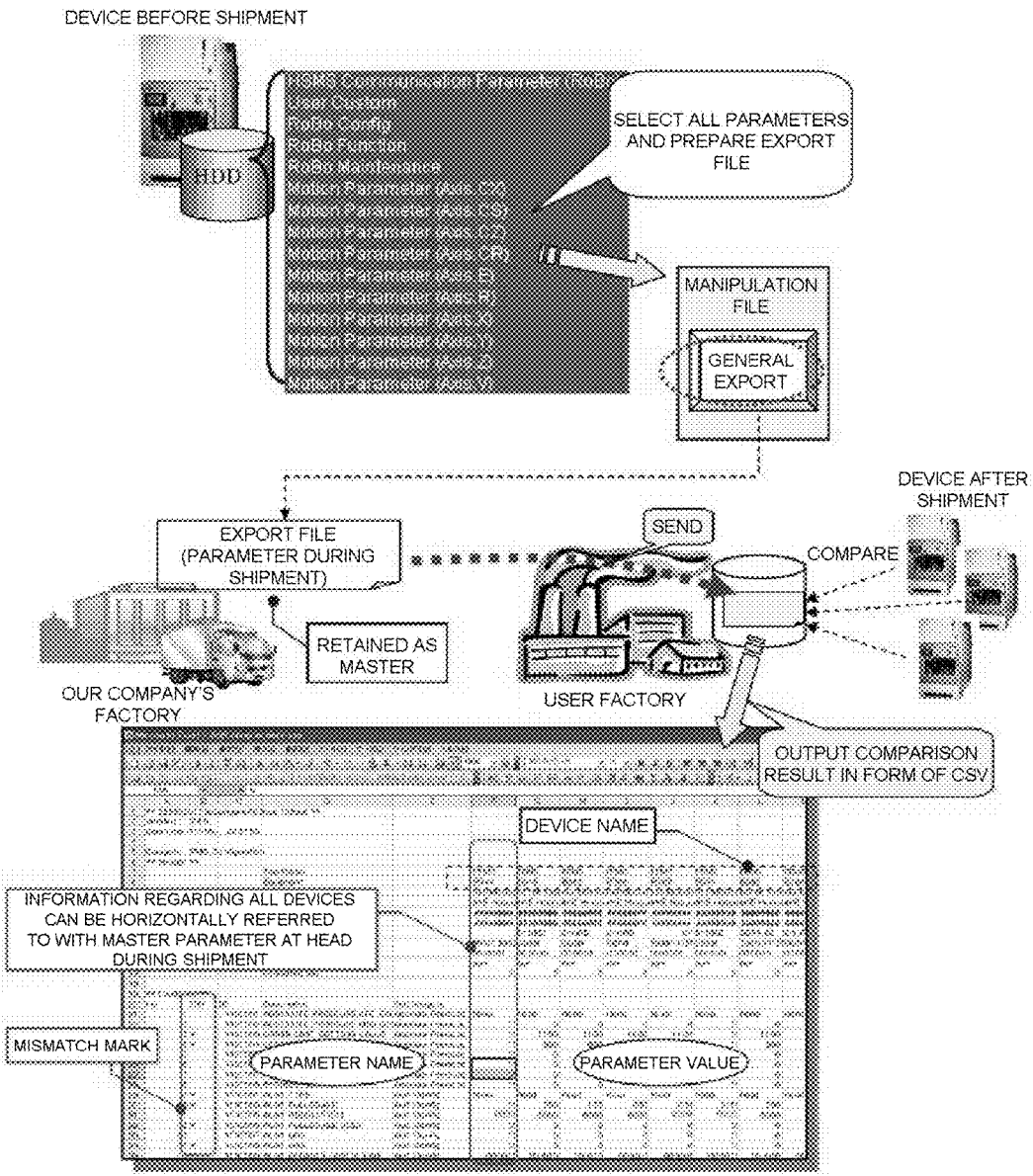
FIG. 14 is a diagram illustrating a file group (an export file) for checking shipment parameters, which is generated by a group management apparatus according to an embodiment of the present invention.

FIG. 14 illustrates an embodiment of the present invention in which the file group 383 for checking shipment parameters is used when parameters of substrate processing apparatuses 100 during shipment and parameters of the substrate processing apparatuses 100 after shipment are compared with one another. In the embodiment of FIG. 14, when a file group (export files) is selected and an 'export' button is pressed, the file group 383 is generated. Then, the file group 383 is stored as a master file. Then, the master file is transmitted to a group management apparatus 500 in a factory which is a shipment site, and the master file and parameters of the respective substrate processing apparatuses 100 after shipment are compared. Here, a parameter comparison performed by the group management apparatus 500 has been described above and is not described again here.

Effects of Alternative Embodiment 1

When all parameters of all shipment devices are checked to detect an undesired change in the parameters after device installation, for example, forty types or more of files and about 30,000 parameters should be checked. Conventionally, this is not easy work. However, according to the present embodiment, all parameters may be easily verified during device shipment. Also, a comparison result may be outputted in the form of a predetermined format and may be viewed in a predetermined display format. As illustrated in FIG. 7, since a mismatch mark is assigned to any difference detected based on a master file in each of parameter items (rows), the validity of a predetermined parameter value may be checked when an undesired parameter change is detected.

Alternative Embodiment 2

Figure 15:
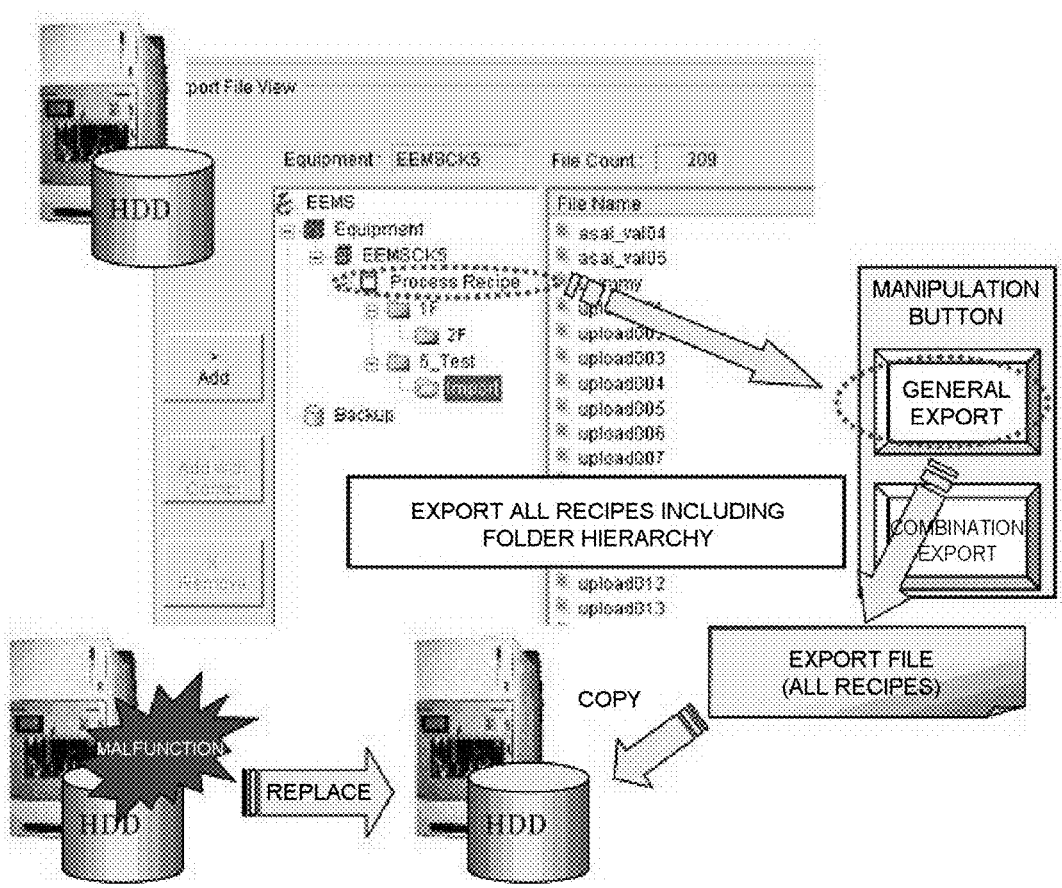
FIG. 15 is a diagram illustrating a file group (an export file) for handling malfunction of a hard disc drive (HDD), which is generated by a group management apparatus, according to an alternative embodiment of the present invention.

In an embodiment of FIG. 15, a file group for handing a malfunction of an HDD is used when an HDD of a substrate processing apparatus 100 malfunctions. Referring to FIG. 15, a file group 383 is generated as a backup of all recipe files including a '1F' folder and a '5_Test' folder of a process recipe layer. In detail, referring to FIG. 15, when a predetermined icon (process recipe) is selected and an 'export' button is pressed, a file group 383 is generated. Then, the file group 383 is stored as a backup file. Then, when an HDD of a substrate processing apparatus 100 malfunctions, the backup file is transmitted to the substrate processing apparatus 100 from another substrate processing apparatus 100 that stores the backup file via a group management apparatus 500. Then, all the recipe files are exchanged between the substrate processing apparatuses 100. An exchange of files using the group management apparatus 500 has already been described above and is not described again here. As described above, files of a substrate processing apparatus are hierarchically classified (device name is first displayed and file type and each file are then sequentially displayed) and are managed. As described above, since the file group 383 is generated in units of layers, a desired file can be easily selected when a file group is generated (i.e., the file group is exported).

Effects of Alternative Embodiment 2

As described above, according to the present embodiment, a file group is generated (exported) in units of layers and thus can be easily backed up in an integrative manner. Also, when according to the present embodiment, the name of a device on a process recipe hierarchy is designated, the file group 383 is generated by exporting all recipe files or table files belonging to this device. The generated file group 383 may be used as a full-backup of the HDD. The file group 383 generated as an export file may be used to recover the HDD when the HDD malfunctions. However, since files may be copied in units of layers, the files can be easily exported.

Alternative Embodiment 3

Figure 16:
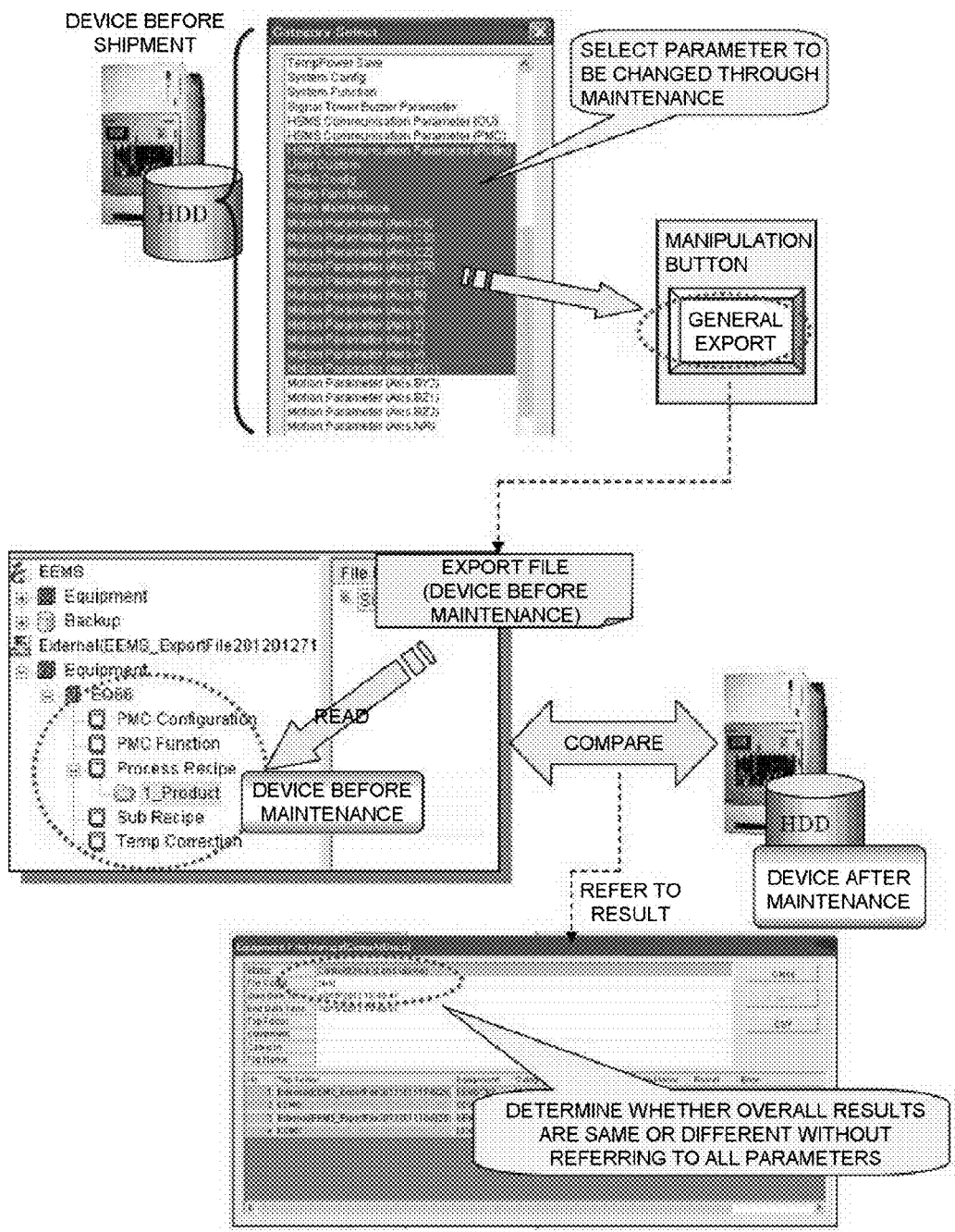
FIG. 16 is a diagram illustrating a file group (an export file) for preventing a non-recovery after maintenance, which is generated by a group management apparatus, according to an alternative embodiment of the present invention.

FIG. 16 illustrates an embodiment of the present invention in which a file group 383 configured to prevent a non-recovery after maintenance is used in order to prevent a process of recovering parameters changed after maintenance from being omitted. As illustrated in FIG. 16, before maintenance, all parameter files to be used (or changed) in the maintenance are selected and an 'export' button is pressed to generate the file group 383. Then, the file group 383 is stored as a backup file. Next, after the maintenance, the backup file (parameters before the maintenance) and parameters after the maintenance are compared using a comparison function of a group management apparatus 500 and whether the backup file and the parameters after the maintenance are different is checked. Since only whether the parameters before the maintenance and the parameters after the maintenance are different is checked, all these parameters do not need to be displayed, but they may be displayed side by side as illustrated in FIG. 7. Here, such a parameter comparison function of the group management apparatus 500 has already been described above and is not described again here.

Effects of Alternative Embodiment 3

There is a case in which an apparatus malfunctions after release since changed parameters of the apparatus are not recovered during maintenance of the apparatus. In general, although whether changed parameters are not recovered is checked after maintenance, the changed parameters are not likely to be recovered when a large number of changed parameters are present. To solve this problem, as described with reference to FIG. 16, target parameters may be exported before maintenance and compared in a lump with an exported file after maintenance, and parameters that are not recovered may thus be easily detected.

In the previous embodiment, since all files belonging to a substrate processing apparatus 100 are targets of export files, various combinations of files that are to be exported may be used according to various usages. Also, in the previous embodiment, since file groups 283 and 383 (combination of files) are used as export files, files of an apparatus may be easily horizontally expanded, thereby reducing the load on an apparatus file management work. Also, since parameter files may be compared at once by jointly using a parameter batch function, the parameters may be checked within a short time period, thereby reducing a time period for interpreting device malfunction on the spot.

Alternatively, since a file group 383 may be generated according to a different usage from in the present embodiment and transmitted via the group management device 500, the file group 383 can be horizontally expanded between substrate processing apparatuses 100.

Also, in the previous embodiment, the communication controller 239b of the substrate processing apparatus 100 is configured to receive monitor data representing the state of the process furnace 202, which is read via an I/O controller, via the process controller 239a and the display device controller 239, but the present invention is not limited thereto. For example, the communication controller 239b may be configured to directly receive the monitor data, which is read via an I/O controller, without using the process controller 239a and the display device controller 239. Also, in the previous embodiment, the communication controller 239b is configured to receive monitor data representing the states of the elements of the substrate processing apparatus 100, which is read via the mechanism machine I/O 238a, via the display device controller 239, but the present invention is not limited thereto. For example, the communication controller 239b may directly receive the monitor data read via the mechanism machine I/O 238a without using the display device controller 239. Also, for example, an I/O controller or the transfer controller 238 may be configured to directly exchange data with the group management apparatus 500 without using the process controller 239a, the display device controller 239 and the communication controller 239b.

Also, in the previous embodiment, although the file group generation function is assigned to the group management apparatus 500, this function may be embodied as a control program stored in the controller 240 for use in the substrate processing apparatus. That is, since the substrate processing apparatus 100 is capable of generating the file groups 283 and 383 (combination of files), files of the substrate processing apparatus 100 may be compared with those of another substrate processing apparatus 100 by directly transmitting the file groups 283 and 383 to the other substrate processing apparatus 100 without using the group management apparatus 500.

Also, since the substrate processing apparatus 100 may have functions of the file groups 283 and 383, the file groups 283 and 383 may be generated using the substrate processing apparatus 100 before shipment to compare parameters before shipment and parameters after shipment. Here, since a substrate processing apparatus 100 during shipment is located in a factory within a semiconductor manufacturing company and a substrate processing apparatus 100 after shipment is located in a factory within a device company, files cannot be exchanged between these substrate processing apparatuses 100 via a communication network such as the Internet. However, for example, the file groups 283 and 383 generated using the substrate processing apparatus 100 during shipment may be stored in an external memory medium such as a compact disc-read only memory (CD-ROM), and files of the substrate processing apparatus 100 during shipment may be compared with those of the substrate processing apparatus 100 after shipment using the external memory medium.

The controller 240 for use in the substrate processing apparatus, the group management apparatus 500 is not limited to a dedicated computer and may be embodied as a general-purpose computer. For example, the controller 240 for use in the substrate processing apparatus and the group management apparatus 500 according to the present embodiment may be configured by preparing an external memory device storing the above program, e.g., a magnetic disc (such as a magnetic tape, a flexible disk, a hard disc, etc.), an optical disc (such as a CD or a digital versatile disc (DVD), etc.), a magneto-optical disc (such as an MO), or a semiconductor memory (such as a universal serial bus (USB) memory, a memory card, etc.), and installing the program into a general-purpose computer via the external memory device. Also, means for supplying a program to a computer is not limited to supplying the program via an external memory device. For example, the program may be supplied to a computer via a communication unit such as the Internet or a dedicated line without using such an external memory device. In this case, the program may be notified using, for example, a bulletin board system (BBS) of a communication network and supplied in the form of carrier waves via a network. As described above, the substrate processing process may be performed by starting the supplied program and performing the program similar to other application programs, under control of an operating system (OS). Also, the data storage unit 239e, the data storage unit 503 and the external memory device may be embodied as non-transitory computer-readable recording media. In the present disclosure, the data storage unit 239e, the data storage unit 503 and the external memory device are also referred to collectively as simply a recording medium. Also, when the term 'recording medium' is used in the present disclosure, it may be understood as including only the data storage unit 239e, the data storage unit 503, or the external memory device, including two devices among the data storage unit 239e, the data storage unit 503 and the external memory device, or including all the data storage unit 239e, the data storage unit 503 and the external memory device.

Also, the present invention is not limited to a case in which the substrate processing apparatus 100 and the group management apparatus 500 are disposed in the same floor (same clean room). For example, the substrate processing apparatus 100 may be disposed in a clean room, the group management apparatus 500 may be disposed in an office room (in a floor in which the clean room is not located), and a file group may be generated at a remote place via the network 400 such as a LAN. Otherwise, only some elements of the group management apparatus 500, e.g., the data display unit 505, may be disposed in an office room.

Also, the present invention may be applied to not only a film-forming treatment for forming various films such as an oxide film, a nitride film, a metal film, etc., but also other substrate processing processes such as diffusion treatment, annealing, oxidation, nitridation, lithography, etc. Also, the present invention may be applied to not only a thin-film forming apparatus but also other substrate processing apparatuses such as an etching apparatus, an annealing apparatus, an oxidizing apparatus, a nitriding apparatus, an exposure apparatus, an applying apparatus, an Molding apparatus, a developing apparatus, a dicing apparatus, a wire bonding apparatus, a drying apparatus, a heating apparatus and an inspecting apparatus. Also, the present invention may be applied to a combination of these apparatuses. Also, the present invention is not limited to a longitudinal substrate processing apparatus 100, and may be a transversal substrate processing apparatus, any of various single-wafer type substrate processing apparatuses, or a combination thereof.

Also, the present invention is not limited to a semiconductor manufacturing apparatus for processing a semiconductor wafer, such as the substrate processing apparatus 100 according to the present embodiment, and may be also applied to a substrate processing apparatus for processing a glass substrate, e.g., an apparatus for manufacturing a liquid crystal display device.

With a group management apparatus, a substrate processing system and a method of managing files of a substrate processing apparatus according to the present invention, the rate of omission of files in acquisition and the workload on an operator may be lowered when a desired file is obtained from the substrate processing apparatus.

Exemplary Embodiments of the Present Invention

Hereinafter, exemplary embodiments of the present invention will be supplementarily noted.

According to an embodiment of the present invention, there is provided a group management apparatus connected to a substrate processing apparatus configured to store at least a configuration file, the group management apparatus including a controller configured to: receive a command for generating a file group for the configuration file; receive the configuration file and at least one associated file related to the configuration file from the substrate processing apparatus according to the command for generating the file group; and generate the file group including the configuration file and the associated file received from the substrate processing apparatus and store the file group in outputtable state.

Preferably, the configuration file includes a combination information that shows the combination of the configuration file and the associated file, and the controller reads the combination information from the configuration file received from the substrate processing apparatus and receives the associated file indicated in the set information.

Preferably, the substrate processing apparatus stores a combination definition file including a combination information that shows the combination of the configuration file and the associated file, and the controller receives the configuration file and the combination definition file from the substrate processing apparatus, reads the combination information from the combination definition file, and receives the associated file indicated in the combination information.

Preferably, the controller displays the configuration file and the associated file included in each of the file group when the controller displays at least one file group.

Preferably, when the controller displays a plurality of file groups, the controller displays the configuration files and the associated file included in each of the plurality of file groups side-by-side.

Preferably, the controller displays the configuration file and the associated file included in each of the plurality of file group in a tree format.

Preferably, the controller sets one of the plurality of file groups as a master file group serving as a reference of comparison when the plurality of file groups are displayed side-by-side.

Preferably, the group management apparatus further includes a display unit, wherein the controller receives the command for generating a file group from the display unit, and transmits the file group including the configuration file and the associated file received from the substrate processing apparatus to another substrate processing apparatus.

According to another aspect of the present invention, there is provided a file group generating program that causes a computer connected to a substrate processing apparatus to perform sequences of: receiving a command for generating a file group for the configuration file; receiving the configuration file and at least one associated file related to the configuration file from the substrate processing apparatus according to the command for generating the file group; and generating the file group including the configuration file and the associated file received from the substrate processing apparatus and store the file group in a state where an output is possible (i.e., in a manner that the file group can be outputted).

According to another aspect of the present invention, there is provided a non-transitory computer-readable recording medium storing a file group generating program that causes a computer connected to a substrate processing apparatus to perform sequences of: receiving a command for generating a file group for the configuration file; receiving the configuration file and at least one associated file related to the configuration file from the substrate processing apparatus according to the command for generating the file group; and generating the file group including the configuration file and the associated file received from the substrate processing apparatus and store the file group in a state where an output is possible.

According to another aspect of the present invention, there is provided a file group comparison/display program that causes a computer connected to a substrate processing apparatus to perform a process of receiving information regarding a predetermined configuration file; obtaining the predetermined configuration file and at least one associated file related to the predetermined configuration file from the substrate processing apparatus, based on the content of the predetermined configuration file; generating a file group including the obtained predetermined configuration file and the associated file and storing the file group in a state where an output is possible; and displaying configuration files and associated files included in a plurality of respective file groups to be compared with one another.

According to another aspect of the present invention, there is provided a non-transitory computer-readable recording medium storing a file group comparison/display program that causes a computer connected to a substrate processing apparatus to perform a process of receiving information regarding a predetermined configuration file; obtaining the predetermined configuration file and at least one associated file related to the predetermined configuration file from the substrate processing apparatus, based on the content of the predetermined configuration file; generating a file group including the obtained predetermined configuration file and the associated file and storing the file group in a state where an output is possible; and displaying configuration files and associated files included in a plurality of respective file groups to be compared with one another.

According to another aspect of the present invention, there is provided a substrate processing system including: a substrate processing apparatus configured to store at least a configuration file; and a group management apparatus connected to the substrate processing apparatus, wherein the group management apparatus is configured to: receive a command for generating a file group for the configuration file; receive the configuration file and at least one associated file related to the configuration file from the substrate processing apparatus according to the command for generating the file group; and generate the file group including the configuration file and the associated file received from the substrate processing apparatus and store the file group in a state where an output is possible.

Preferably, the configuration file may include a combination information that shows the combination of the configuration file and the associated file. When the controller receives the configuration file and the associated file from the substrate processing apparatus, the controller may obtain the configuration file, reads the combination information from the configuration file, and receives the associated file indicated in the combination information.

According to another aspect of the present invention, there is provided a method of transmitting files of a substrate processing apparatus, the method including receiving at least device-specific information specifying the substrate processing apparatus and information regarding a configuration file; obtaining the configuration file and at least one associated file related to the configuration file from the substrate processing apparatus, based on the content of the configuration file; generating a file group including obtained the configuration file and the associated file; and transmitting the file group to another substrate processing apparatus other than the substrate processing apparatus specified with the device-specific information.

According to another aspect of the present invention, there is provided a method of transmitting files of a substrate processing apparatus, the method including receiving device-specific information specifying the substrate processing apparatus and information regarding a configuration file; obtaining the configuration file and at least one associated file related to the configuration file from the substrate processing apparatus, based on the content of the configuration file; generating a file group including obtained the configuration file and the associated file; transmitting the file group to another substrate processing apparatus other than the substrate processing apparatus specified with the device-specific information; and comparing the file group with files of the other substrate processing apparatus that correspond to the file group.

According to another aspect of the present invention, there is provided a method of managing files of a substrate processing apparatus, the method including receiving information regarding a configuration file; obtaining the configuration file and at least one associated file related to the configuration file from the substrate processing apparatus, based on the content of the configuration file; and generating a file group including the obtained configuration file and the associated file and storing the file group in a state where an output is possible.

According to another aspect of the present invention, there is provided a method of transmitting files of a substrate processing apparatus, the method including displaying a plurality of files on a manipulation screen; selecting a predetermined file among the plurality of files, and receiving device-specific information specifying a predetermined substrate processing apparatus and information regarding the predetermined file; generating a file group including the predetermined file and storing the file group in a state where an output is possible; and transmitting the file group to another substrate processing apparatus other than the predetermined substrate processing apparatus specified with the device-specific information.

According to another aspect of the present invention, there is provided a method of comparing files of a substrate processing apparatus, the method including displaying a plurality of files on a manipulation screen; selecting a predetermined file among the plurality of files, and receiving device-specific information specifying a predetermined substrate processing apparatus and information regarding the predetermined file; generating a file group including the predetermined file and storing the file group in a state where an output is possible; transmitting the file group to another substrate processing apparatus other than the predetermined substrate processing apparatus specified with the device-specific information; and comparing the file group with files of the other substrate processing apparatus that correspond to the file group.

What is claimed is:

1. A management apparatus connected to a substrate processing apparatus configured to store at least a configuration file including at least a process recipe defining a process condition and a process order, the management apparatus comprising:
   an input reception unit configured to receive a command for obtaining the configuration file or a combination file including the configuration file and an associated file;
   a file obtaining unit configured to obtain the configuration file and the associated file from the substrate processing apparatus according to the command received by the input reception unit;
   a file group generation unit configured to generate a file group by summarizing the configuration file or by summarizing the configuration file and the associated file obtained by the file obtaining unit;
   a file group storage unit configured to store the file group generated by the file group generation unit; and
   a controller comprising at least one processing unit, the controller being configured to read the process recipe in the configuration file received by controlling the input reception unit, the file obtaining unit, the file group generation unit and the file group storage unit,
   wherein the associated file comprises at least one selected from the group consisting of: a sub-recipe file containing a sub-recipe related to the process recipe, a temperature control parameter file containing a proportional integral derivative (PID) table for performing temperature control, a pressure control parameter file containing a PID table for performing pressure control, and a transfer parameter file containing transfer parameters.

2. The management apparatus of claim 1, wherein the file obtaining unit is further configured to read from the configuration file a combination definition information representing a combination of the configuration file and the associated file and receive an entirety of the associated file indicated in the combination definition information when obtaining the configuration file and the associated file from the substrate processing apparatus.

3. The management apparatus of claim 1, further comprising: a storage unit configured to store a combination definition file including a combination definition information representing a combination of the configuration file and the associated file,
   wherein the file obtaining unit is further configured to read from the configuration file stored in the storage unit a combination definition information representing a combination of the configuration file and the associated file and receive an entirety of the associated file indicated in the combination definition information when obtaining the configuration file and the associated file from the substrate processing apparatus.

4. The management apparatus of claim 3, wherein the storage unit is further configured to store at least one selected from the group consisting of: a restoring file for handling a malfunction of a hard disc drive (HDD) and a restoring file for preventing a non-recovery after maintenance as the configuration file.

5. The management apparatus of claim 3, wherein the storage unit is further configured to store at least one selected from the group consisting of: a file group for checking shipment parameters, a file group for handling a malfunction of a hard disc drive (HDD), and a file group for preventing a non-recovery after maintenance as the file group.

6. The management apparatus of claim 1, further comprising: a display unit configured to display the configuration file and the associated file included in the file group.

7. The management apparatus of claim 6, wherein the display unit is configured to display the configuration files and the associated file included in each of a plurality of file groups side-by-side.

8. The management apparatus of claim 7, wherein the controller is configured to set one of the plurality of file groups as a master file group serving as a reference of comparison when the display unit displays the plurality of file groups side-by-side.

9. The management apparatus of claim 6, wherein the display unit is configured to display the configuration file and the associated file included in the file group in a tree format.

10. The management apparatus of claim 1, further comprising a communication control unit configured to transmit the file group including the configuration file and the associated file obtained from the substrate processing apparatus to another substrate processing apparatus.

11. A management apparatus connected to a substrate processing apparatus configured to store a configuration file including at least a process recipe defining a process condition and a process order, the management apparatus comprising:
   an input reception unit configured to receive a command for obtaining device-specific information specifying the substrate processing apparatus and the configuration file;

a file obtaining unit configured to obtain the configuration file and an associated file from the substrate processing apparatus according to the command received by the input reception unit;

a file group generation unit configured to generate a file group by summarizing the configuration file or by summarizing the configuration file and the associated file obtained by the file obtaining unit;

a communication control unit configured to transmit a file to the substrate processing apparatus; and a controller comprising at least one processing unit, the controller being configured to read the process recipe in the configuration file received by controlling the input reception unit, the file obtaining unit, the file group generation unit and the file group storage unit, wherein the associated file comprises at least one selected from the group consisting of: a sub-recipe file containing a sub-recipe related to the process recipe, a temperature control parameter file containing a proportional integral derivative (PID) table for performing temperature control, a pressure control parameter file containing a PID table for performing pressure control and a transfer parameter file containing transfer parameters, and the controller is further configured to control the communication control unit to transmit the file group to the substrate processing apparatus based on the device-specific information.

* * * * *